(12) United States Patent
Allen et al.

(10) Patent No.: US 12,122,109 B2
(45) Date of Patent: Oct. 22, 2024

(54) TELECOMMUNICATIONS ENCLOSURE SYSTEM

(71) Applicant: COMMSCOPE TECHNOLOGIES LLC, Hickory, NC (US)

(72) Inventors: Barry Wayne Allen, Siler City, NC (US); Erik David Bishop, Fuquay-Varina, NC (US); Harry L. Vaswani, Garner, NC (US)

(73) Assignee: CommScope Technologies LLC, Hickory, NC (US)

(*) Notice: Subject to any disclaimer, the term of this patent is extended or adjusted under 35 U.S.C. 154(b) by 366 days.

(21) Appl. No.: 17/612,473

(22) PCT Filed: May 18, 2020

(86) PCT No.: PCT/US2020/033444
§ 371 (c)(1),
(2) Date: Nov. 18, 2021

(87) PCT Pub. No.: WO2020/236740
PCT Pub. Date: Nov. 26, 2020

(65) Prior Publication Data
US 2022/0227083 A1   Jul. 21, 2022

Related U.S. Application Data

(60) Provisional application No. 62/849,879, filed on May 18, 2019, provisional application No. 62/986,183, filed on Mar. 6, 2020.

(51) Int. Cl.
G02B 6/44       (2006.01)
B29D 11/00      (2006.01)
B29K 309/08     (2006.01)

(52) U.S. Cl.
CPC .... B29D 11/00673 (2013.01); B29D 11/0075 (2013.01); G02B 6/4432 (2013.01); G02B 6/4471 (2013.01); B29K 2309/08 (2013.01)

(58) Field of Classification Search
CPC .............. G02B 6/4432; B29D 11/0075; B29D 11/00673
See application file for complete search history.

(56) References Cited

U.S. PATENT DOCUMENTS 5,975,769 A   11/1999   Larson et al.
7,120,347 B2  10/2006   Blackwell et al.
(Continued)

FOREIGN PATENT DOCUMENTS

JP    2014-025976 A    2/2014
KR    10-2007-0099672 A    10/2007
(Continued)

OTHER PUBLICATIONS

Extended European Search Report for Application No. 20809135.5 mailed May 19, 2023.
(Continued)

Primary Examiner — Sung H Pak
(74) Attorney, Agent, or Firm — Merchant & Gould P.C.

(57) ABSTRACT

The present disclosure relates to systems, apparatuses and methods for efficiently manufacturing telecommunications enclosure customized to meet customer needs. The system can include a terminal housing and port units bondable to the terminal housing.

38 Claims, 36 Drawing Sheets

(56) References Cited

U.S. PATENT DOCUMENTS

| | | |
|---|---|---|
| 7,397,997 B2 | 7/2008 | Mertesdorf et al. |
| 7,753,396 B2 | 7/2010 | Cox |
| 8,861,919 B2 | 10/2014 | Alston et al. |
| 10,288,820 B2 | 5/2019 | Coenegracht et al. |
| 10,379,298 B2 | 8/2019 | Dannoux et al. |
| 10,502,920 B2 | 12/2019 | Coenegracht et al. |
| 10,684,426 B2 | 6/2020 | Everaert |
| 2008/0081127 A1 | 4/2008 | Thompson et al. |
| 2012/0257862 A1 | 10/2012 | Deel et al. |
| 2016/0147023 A1* | 5/2016 | Cox ..................... G02B 6/387 385/86 |
| 2018/0045894 A1 | 2/2018 | Fujikura et al. |
| 2018/0196215 A1* | 7/2018 | Claessens ............ G02B 6/3897 |
| 2019/0079251 A1 | 3/2019 | Everaert |

FOREIGN PATENT DOCUMENTS

| | | |
|---|---|---|
| WO | 2018/149913 A1 | 8/2018 |
| WO | 2018/149917 A1 | 8/2018 |
| WO | 2020/014210 A1 | 1/2020 |

OTHER PUBLICATIONS

International Search Report and Written Opinion of the International Searching Authority for International Patent Application No. PCT/US2020/033444 mailed Sep. 8, 2020, 9 pages.

\* cited by examiner

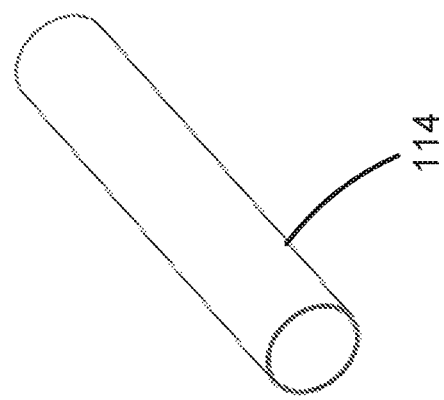
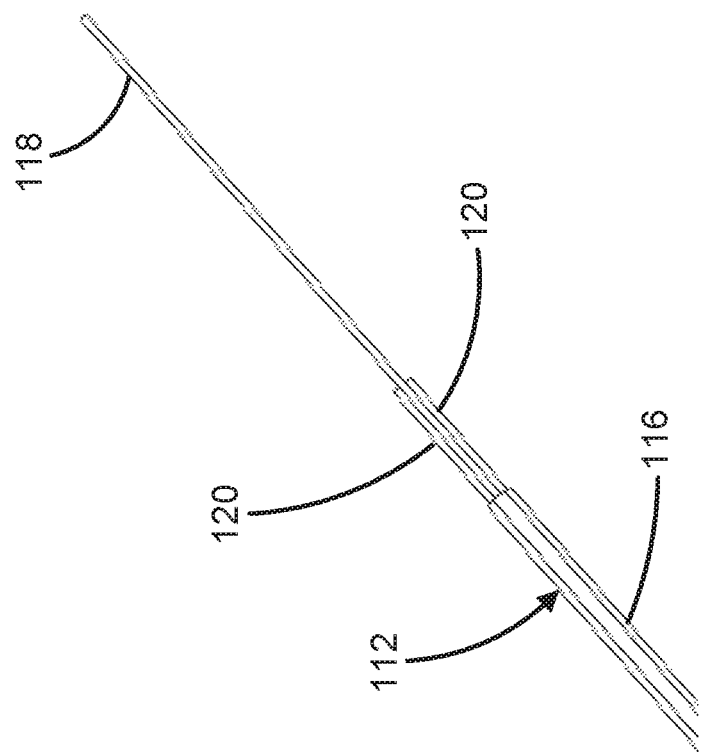
FIG. 7

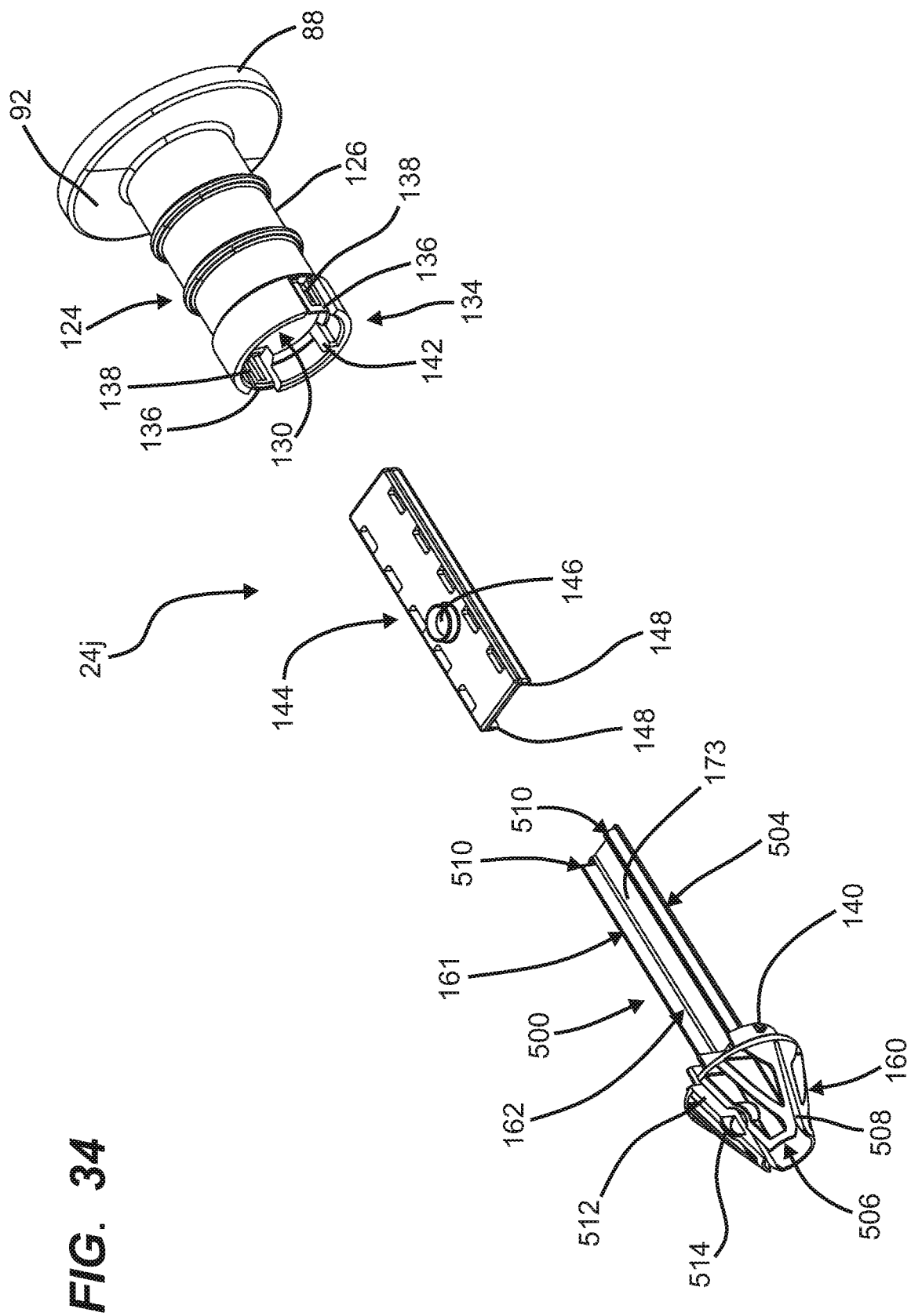

TELECOMMUNICATIONS ENCLOSURE SYSTEM

CROSS-REFERENCE TO RELATED APPLICATIONS

This application is a National Stage Application of PCT/US2020/033444, filed on May 18, 2020, which claims the benefit of U.S. Patent Application Ser. No. 62/849,879, filed on May 18, 2019, and claims the benefit of U.S. Patent Application Ser. No. 62/986,183, filed on Mar. 6, 2020, the disclosures of which are incorporated herein by reference in their entireties. To the extent appropriate, a claim of priority is made to each of the above disclosed applications.

TECHNICAL FIELD

The present disclosure relates generally to telecommunications enclosures. More particularly, the present disclosure relates to telecommunications enclosures including hardened fiber optic connector ports.

BACKGROUND

Telecommunications enclosures, such as multi-service terminals, are commonly used to provide fiber optic connection locations in the field. The telecommunications enclosures often include hardened fiber optic adapter ports adapted for receiving hardened fiber optic connectors. Example telecommunications enclosures including hardened fiber optic adapter ports are disclosed by U.S. Pat. Nos. 7,397,997; 7,120,347; and 7,753,596.

SUMMARY

Aspects of the present disclosure related to methods, systems and apparatuses that allow for a highly customized telecommunications enclosure product line to be derived from an inventory that can be efficiently managed in a cost effective manner.

Another aspect of the present disclosure relates to a method of manufacturing a telecommunications enclosure. The telecommunications enclosure includes a terminal housing. The terminal housing includes an opening surrounded by a first bonding interface. The method includes selecting a port unit from a plurality of port units. The port units of the plurality of port units each have an attachment plate including a second bonding interface that is compatible with the first bonding interface. The port units of the plurality of port units include a first port unit including a hardened fiber optic adapter and a second port unit including a cable securement location. The method also includes bonding the second bonding interface of the selected port unit to the first bonding interface.

Another aspect of the present disclosure relates to an inventory system for telecommunications enclosures. The inventory system includes a terminal housing including an opening surrounded by a first bonding interface. The inventory system also includes a plurality of port units. The port units of the plurality of port units each have an attachment plate including a second bonding interface that is compatible with the first bonding interface. The port units of the plurality of port units include a first port unit including a hardened fiber optic adapter and a second port unit including a cable securement location.

A further aspect of the present disclosure relates to a telecommunications enclosure including a terminal housing. The terminal housing has an opening surrounded by a first bonding interface. The telecommunications enclosure also includes a port unit having an attachment plate including a second bonding interface that is bonded with the first bonding interface such that the attachment plate covers the opening. The port unit includes a cable securement location that projects outwardly from the attachment plate. The telecommunications enclosure also includes a fiber optic cable affixed to the port unit at the securement location. The fiber optic cable includes at least one optical fiber routed through the port unit into an interior of the terminal housing.

A further aspect of the present disclosure relates to a telecommunications enclosure including a terminal housing having an opening surrounded by a first bonding interface. The telecommunications enclosure also includes a port unit having an attachment plate including a second bonding interface that is bonded with the first bonding interface such that the attachment plate covers the opening. The port unit includes a single hardened fiber optic adapter secured to the attachment plate. The hardened fiber optic adapter includes a hardened connector port that faces away from the terminal housing and a non-hardened connector port that faces toward an interior of the terminal housing.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings which are incorporated and constitute part of the description, illustrate numerous aspects of the present disclosure. A brief description of the drawings is as follows:

FIGS. 7-17 depict a sequence of steps for using the port unit of FIG. 3 to install a fiber optic cable on the terminal of FIG. 3;

FIG. 34 is an exploded view of the port unit of FIG. 28;

DETAILED DESCRIPTION

Figure 1:
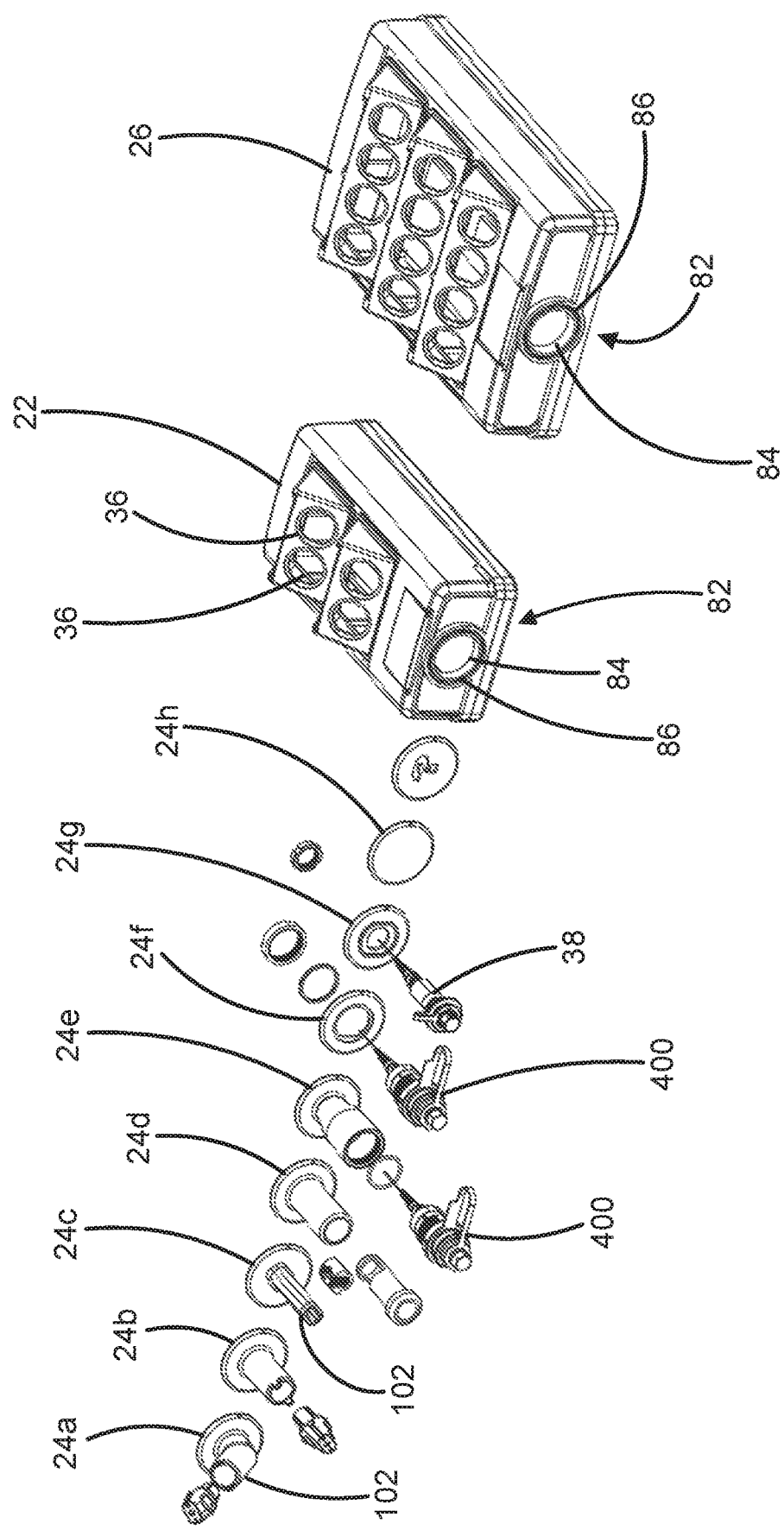
FIG. 1 depicts an inventory system in accordance with the principles of the present disclosure for manufacturing telecommunications enclosures.

FIG. 1 shows an inventory system 20 in accordance with the principles of the present disclosure for manufacturing telecommunications enclosures. The inventory system 20 preferably includes at least one terminal housing 22, and a plurality of port units 24a-24h that are installable on the terminal housing 22. By selecting different ones of the port units 24a-24h for installation on the terminal housing 22, a large number of different telecommunication enclosure configurations can be manufactured. To provide further customization, more than one terminal housing can be provided that is compatible with the port units 24a-24h. For example, FIG. 1 depicts a second terminal housing 26 having a different drop-port count than the terminal housing 22. The port units 24a-24h are installable on either of the terminal housings 22, 26. It will be appreciated that example ports can include cable pass-through ports as well as connector receiving ports. Referring to FIG. 1, port units 24a, 24b, 24c and 24d are configured to provide cable pass-through ports, while port units 24e, 24f and 24g are configured to provide connector receiving ports. Port unit 24h is a blank which is installed at a location where it is not desired to have a port.

Referring still to FIG. 1, the terminal housing 22 is configured to form a terminal of the type often referred to as a drop terminal or a multi-service terminal. The terminal housing 22 includes a base 28 and a cover 30 that mounts to the base 28. In certain examples, the base 28 and the cover 30 are bonded together and have mating bonding interfaces. The cover 30 includes a main cover body 32 and a plurality of drop port modules 34 bonded to the main cover body 32. The drop port modules 34 define locations 36 for mounting hardened fiber optic adapters. The locations 36 can include openings at which the hardened fiber optic adapters are mounted. Each of the hardened fiber optic adapters, when mounted to the terminal housing 22, can provide a hardened outer port adapted for receiving a hardened fiber optic connector and a non-hardened inner port adapted for receiving a non-hardened fiber optic connector. It will be appreciated that the hardened outer ports are accessible outside the terminal housing 22, while the inner ports face into the interior of the terminal housing 22.

Figure 26:
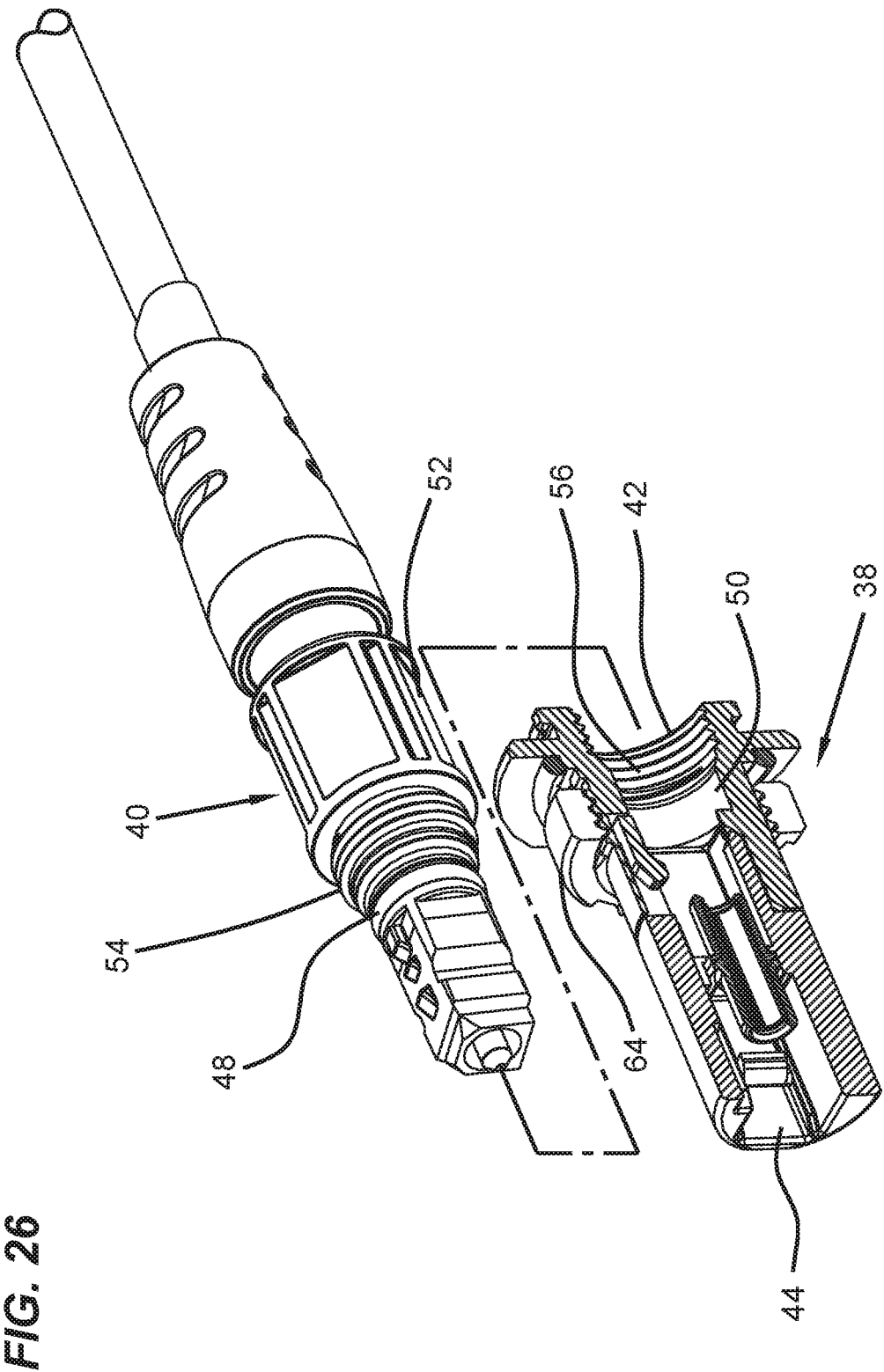
FIG. 26 depicts an example hardened fiber optic connector aligned with a corresponding hardened fiber optic adapter.

FIG. 26 shows an example hardened fiber optic adapter 38 aligned with a corresponding hardened fiber optic connector 40. The hardened fiber optic adapter 38 is adapted to mechanically and optically couple together two fiber optic connectors inserted within opposite ports of the hardened fiber optic adapter 38. The hardened fiber optic adapter 38 includes a hardened outer port 42 adapted for receiving the hardened fiber optic 40 and a non-hardened inner port 44 adapted for receiving a non-hardened fiber connector such as an SC connector. The hardened fiber optic adapter 38 includes an internal fiber alignment structure such as an alignment sleeve 46 for receiving and aligning ferrules corresponding to the fiber optic connectors desired to be coupled together. When the hardened fiber optic connector 40 is secured within the hardened fiber optic adapter 38, the hardened fiber optic connector 40 and the hardened fiber optic adapter 38 are preferably sealed relative to one another. For example, the hardened fiber optic connector 40 can include a seal 48 that engages a sealing surface 50 within the fiber optic adapter 38 to provide sealing. In other examples, the seal may be provided as part of the fiber optic adapter, and in certain examples sealing may take place at the exterior of the fiber optic adapter.

The hardened fiber optic connector 40 is preferably retained within the hardened outer port 42 by a relative robust mechanical fastening arrangement. In certain examples, mechanical fastening arrangement is a turn-to-engage fastening arrangement such as a threaded connection interface, a bayonet-style connection interface or other type of interface that interlocks when twisted together. In the depicted example, the hardened fiber optic connector 40 includes a fastener 52 having exterior threads 54 that thread within corresponding interior threads 56 defined within the hardened outer port 42 of the hardened fiber optic adapter 38.

Figure 27:
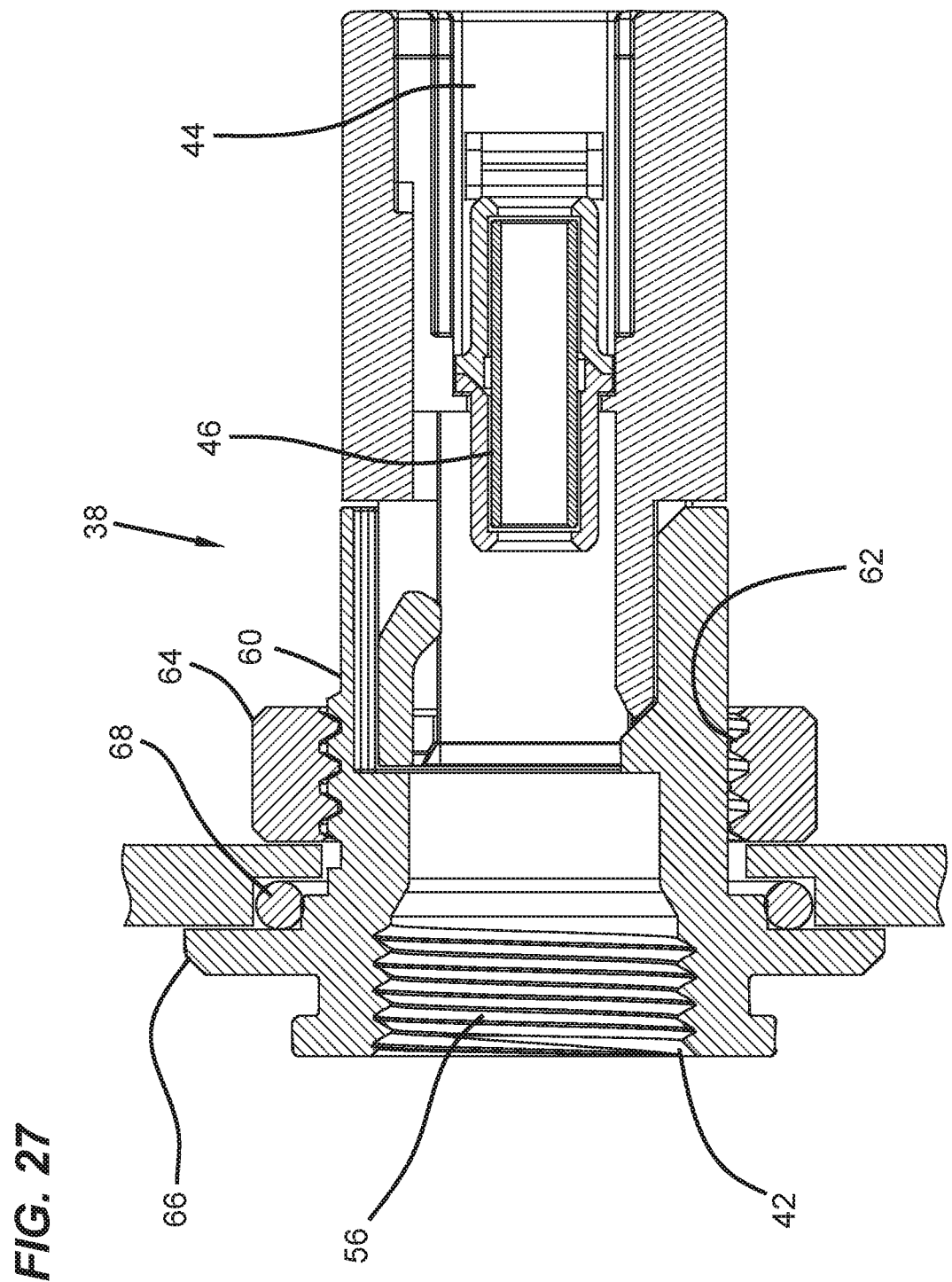
FIG. 27 is a cross-sectional view showing the hardened fiber optic adapter of FIG. 26 mounted to a plate.
Figure 28:
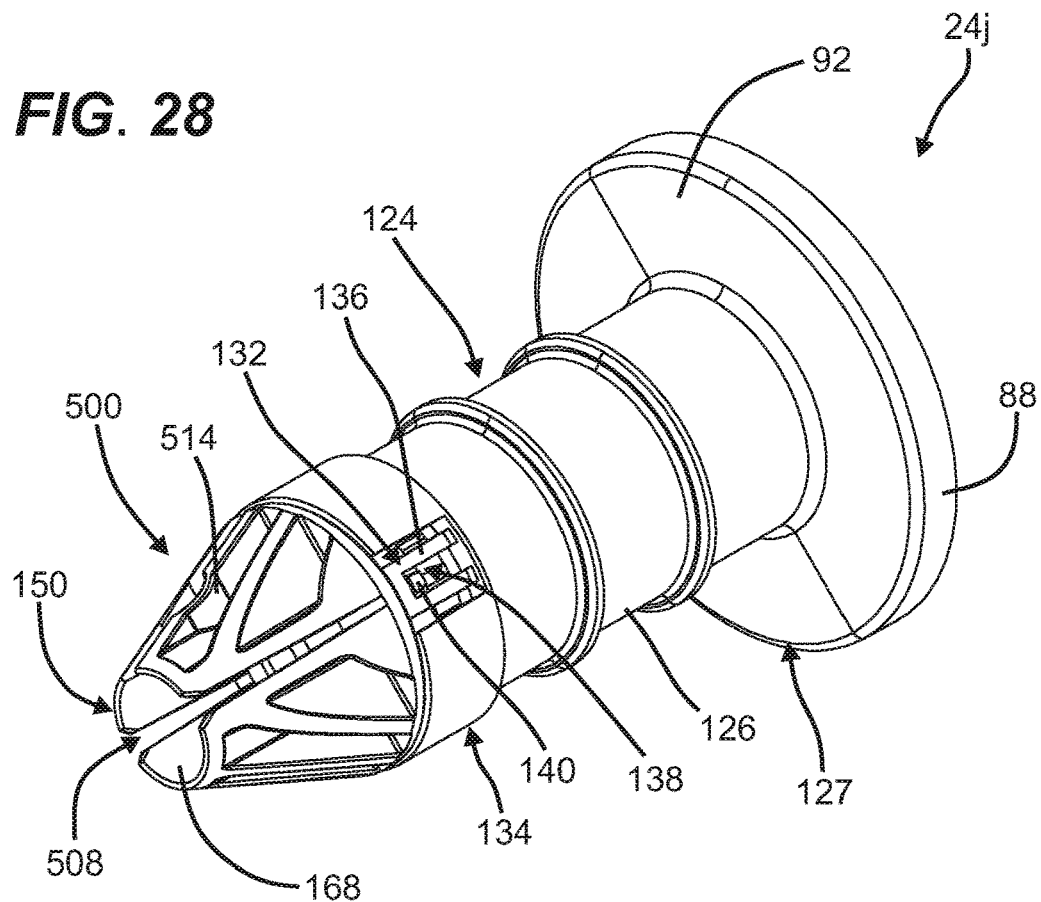
FIG. 28 is a perspective view depicting an outer end of another port unit in accordance with the principles of the present disclosure.
Figure 29:
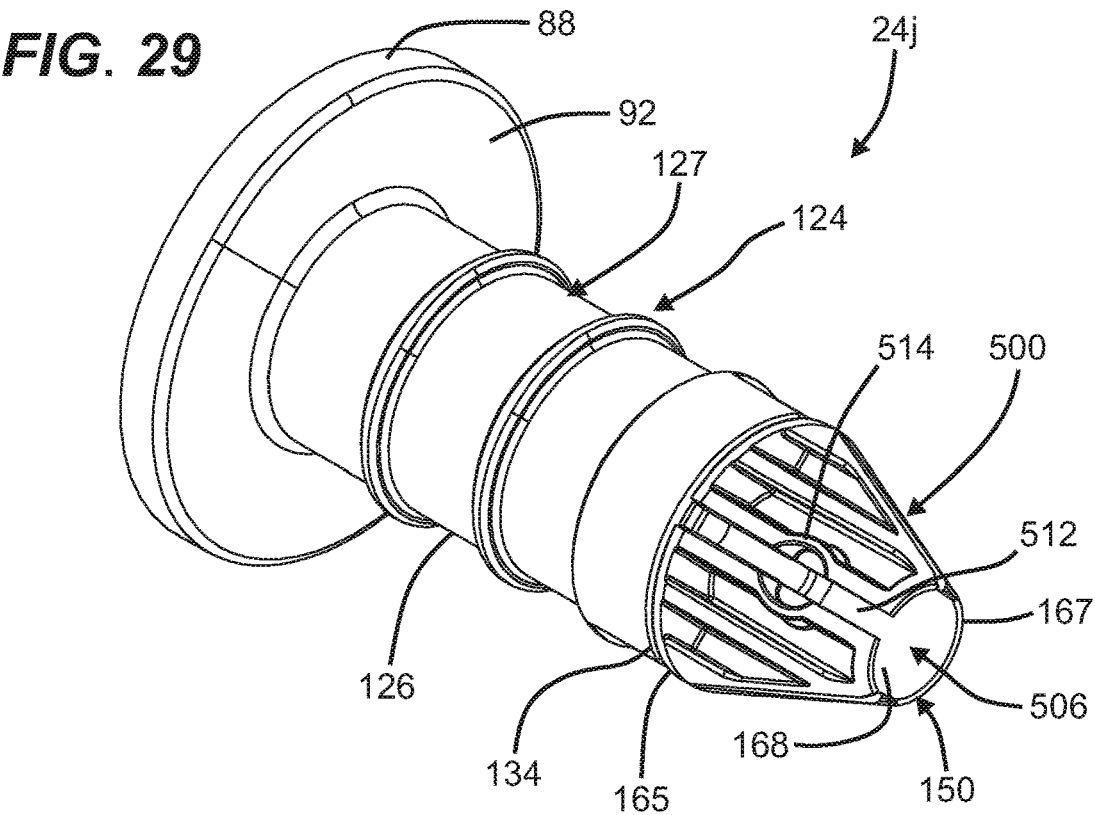
FIG. 29 is another perspective view depicting the outer end of the port unit of FIG. 28.
Figure 30:
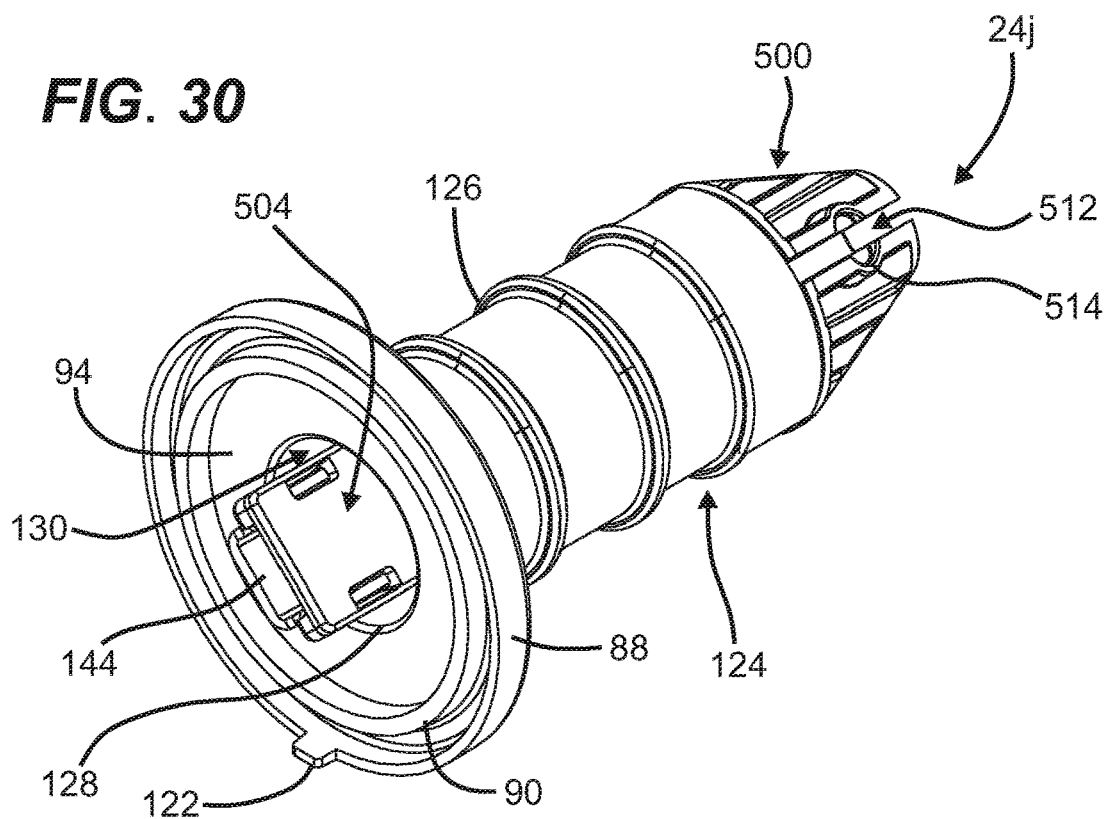
FIG. 30 is a perspective view depicting an inner end of the port unit of FIG. 28.
Figure 31:
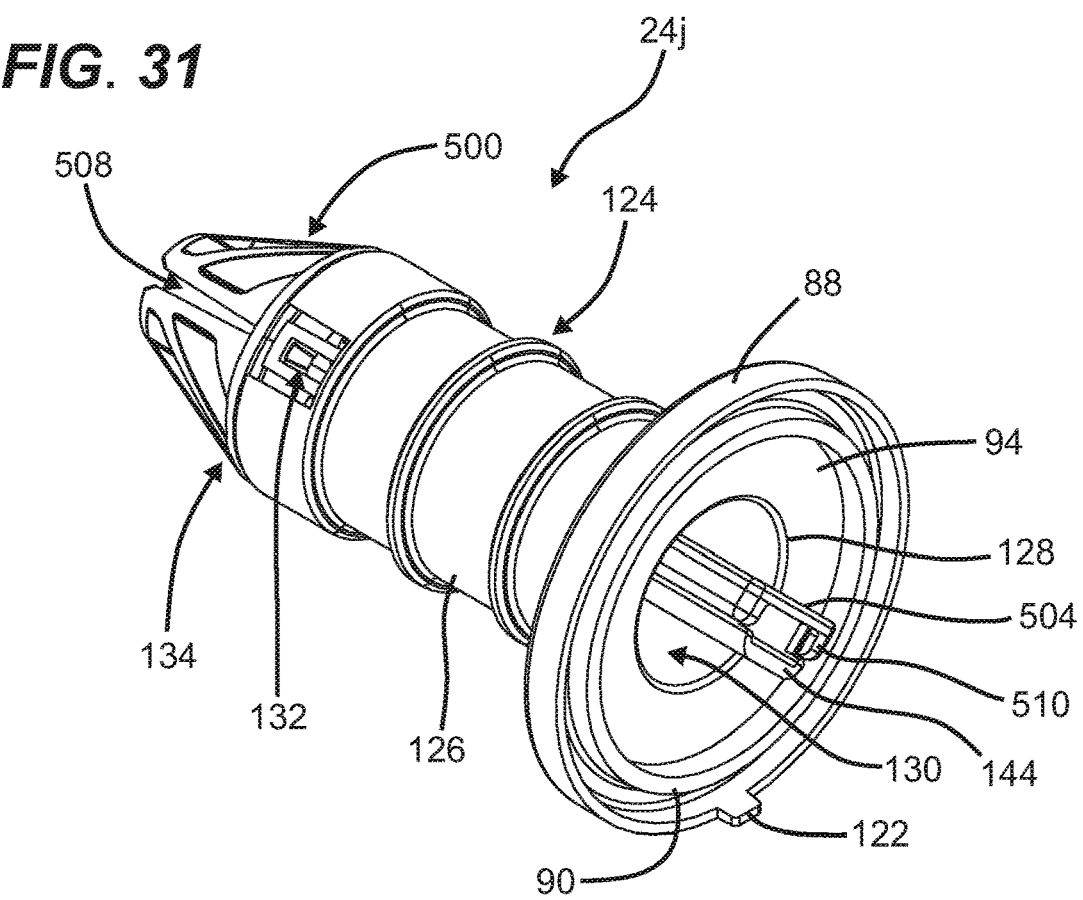
FIG. 31 is a another perspective view depicting the inner end of the port unit of FIG. 28.
Figure 32:
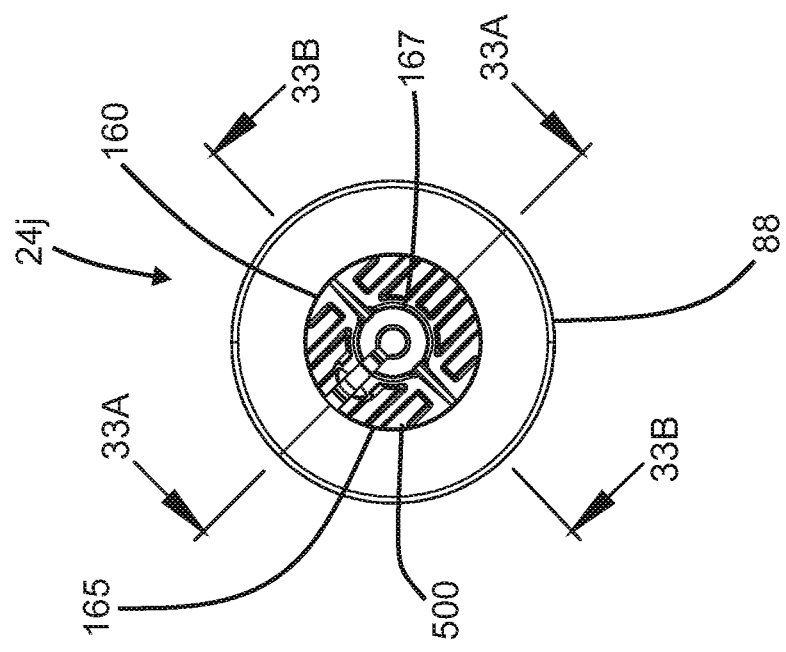
FIG. 32 is an end view of the port unit of FIGS. 28-31.

The hardened fiber optic adapter 38 includes an outer body 60 having exterior threads 62 which can be engaged by a threaded fastener 64. The exterior threads 62 and the threaded fastener 64 can be used to secure the hardened fiber optic adapter 38 within an opening 65 in a structure such as a terminal housing or a plate as shown at FIG. 27. When mounted, the hardened fiber optic adapter 38 extends through the opening 65 and the structure is captured between the threaded fastener 64 threaded on the external thread 62 and an outer flange 66 of the outer body 60. A seal 68 can be used to provide sealing between the structure and outer body of the hardened fiber adapter 38. It will be appreciated that the fastening arrangement of FIG. 27 can be used to secure hardened fiber optic adapters at the locations 36 on the drop port modules 34.

Figure 3:
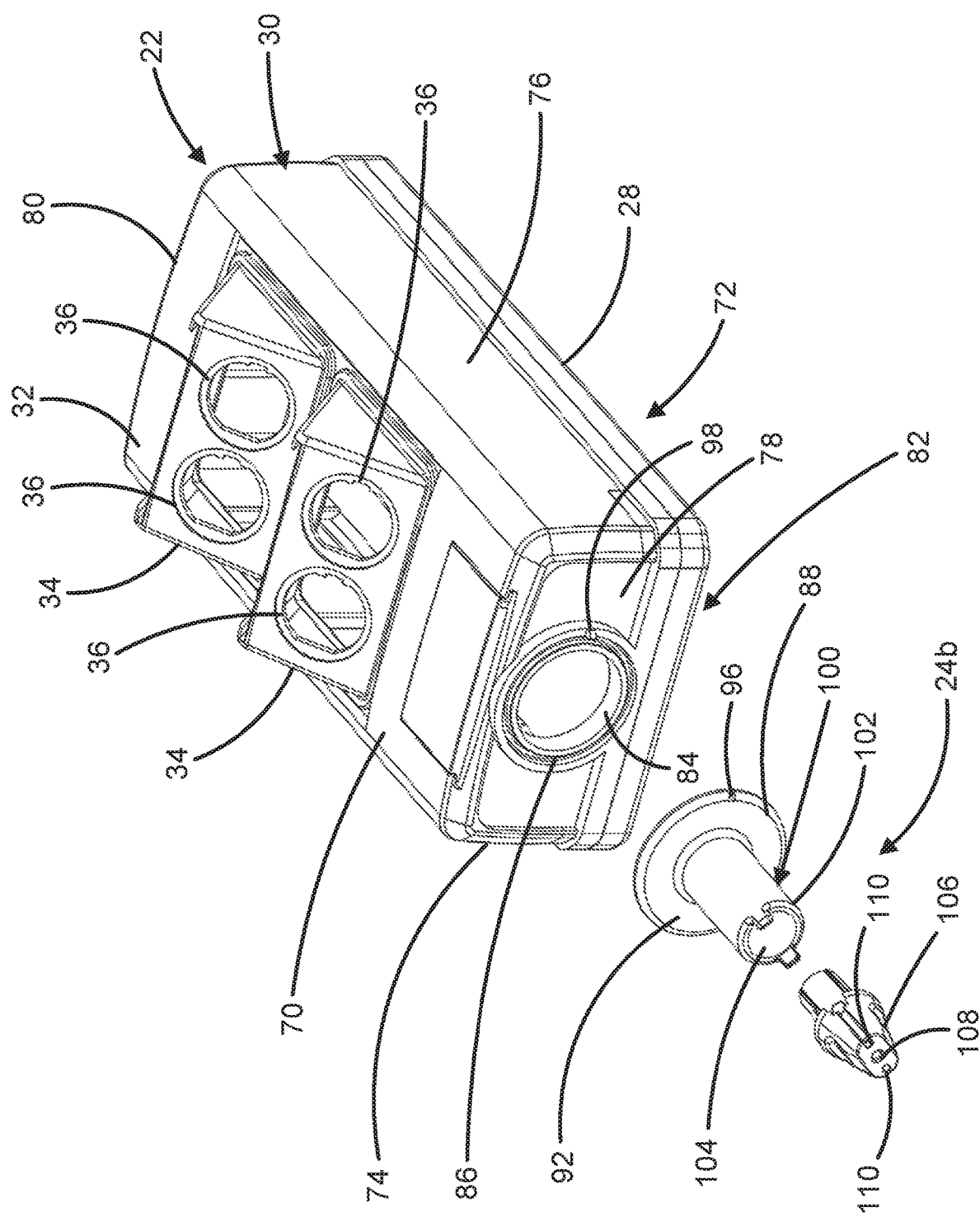
FIG. 3 depicts a terminal of the inventory system of FIG. 1 shown aligned with a corresponding port unit adapted to be bonded to the terminal.

Referring back to FIG. 1, the base terminal housing 26 is preferably configured to include both drop ports and feed ports. In the depicted example, drop ports can be provided at each of the locations 36. As shown at FIG. 3, terminal housing 22 includes a front side 70 and a back side 72. The terminal housing 22 further includes left and right sides 74, 76 that extend between the front and back side 70, 72. Additionally, terminal housing 22 includes a first end 78 and an opposite second end 80. The first and second ends 78, 80 extend between the front and back sides 70, 72 and between the left and right sides 74, 76. In the depicted example, a feeder port location 82 is provided at the first end 78. In use, optical fibers routing into a terminal through a given feeder port location are often optically connected to corresponding drop port locations by optical fiber routed within the terminal. The ports can be optically connected together by direct optic connections or through optical devices such as passive optical power splitters and wavelength division multi-plexers.

Referring to FIG. 1, feeder port locations 82 are provided at the ends 78 of each of the terminal housings 22, 26. Each feeder port location 82 includes an opening 84 surrounded by a first bonding interface 86. In one example, the first bonding interface 86 can include an annular groove. Other bonding interfaces can be utilized as well. For example, the feeder port locations 82 can be provided with annular projections such as tongues or other shapes suitable for facilitating adhesively or otherwise bonding two components together.

Each of the port units 24a-24h includes an attachment plate 88 having a second interface 90 that is compatible with the first bonding interface 86. In the depicted example, the second bonding interface 90 can include an annular tongue that fits within the annular groove of the first bonding interface 86. In other examples, the second bonding interface 90 can include an annular groove or other type of groove. Furthermore, the interface need not be annular. It can be other shapes such as polygon shaped, oval shaped, racetrack shaped or other shapes. Similarly, while the plates 88 are shown as being circular, they can also be other shapes such as oval, polygonal, racetrack or other shapes.

It will be appreciated that by providing a number of different types of port units 24a-24h, and by providing a compatible interface between each of the port units 24a-24h and the port locations 82 on the terminal housing 22, it is possible to configure the terminal housing 22 in a large number of different enclosure configurations to meet customer demands by simply selecting the appropriate port units 24a-24h and bonding the port units 24a-24h to the port locations 82. It will be appreciated that bonding between the port units 24a-24h and the port locations 82 preferably attaches the port units 24a-24h to the terminal housing 22, also provides sealing between the port units 24a-24h and the terminal housing 22.

Figure 2:
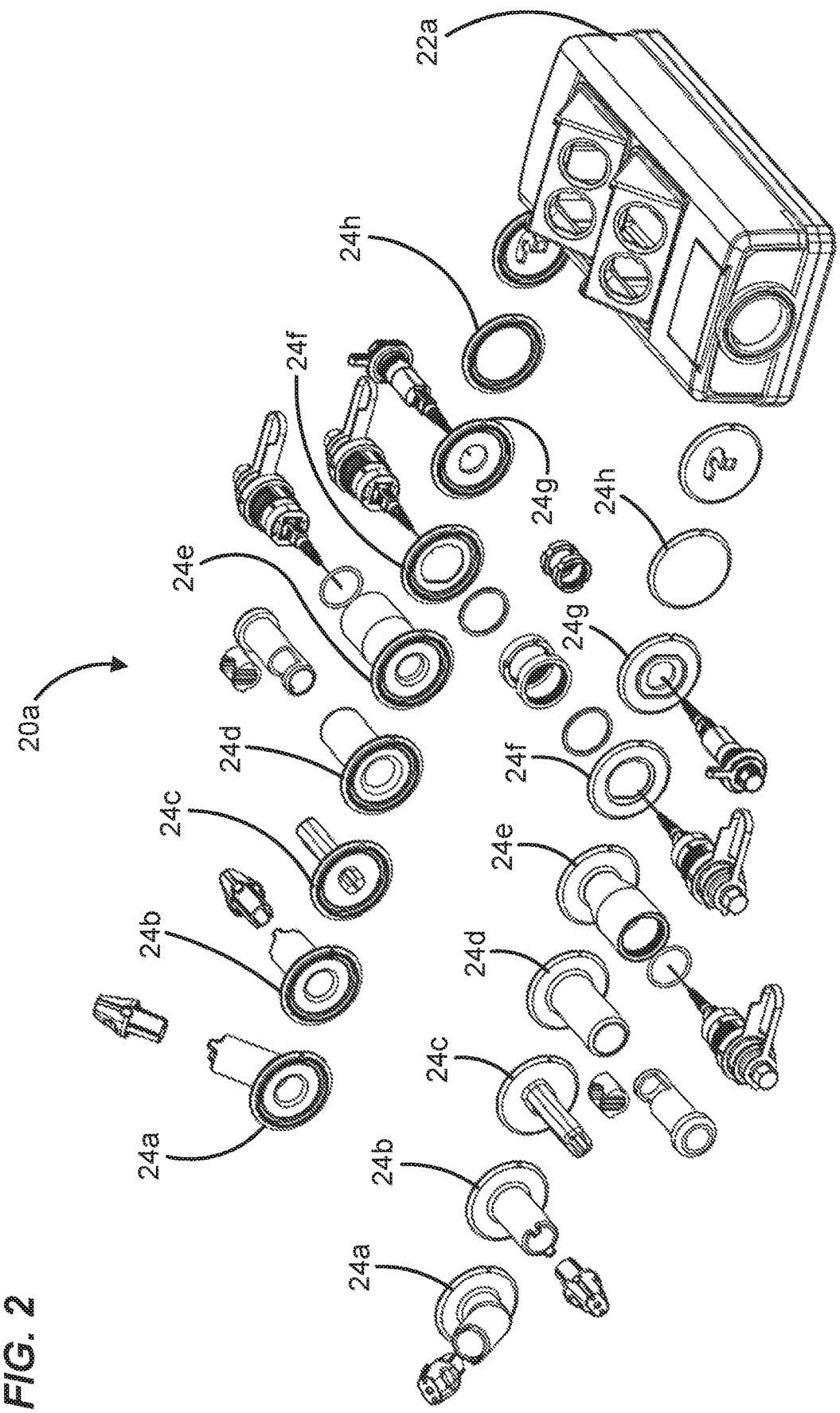
FIG. 2 illustrates another inventory system in accordance with the principles of the present disclosure for manufacturing telecommunications enclosures.

FIG. 2 depicts an inventory system 22a which is the same as the inventory system 20 of FIG. 1 except the depicted system 20a includes a terminal housing 22a having feeder port locations 82 at both ends 78, 80 of the terminal housing 22. Therefore, the terminal housing 22a can be configured in an in-line, pass-through configuration where optical fibers can be passed through the enclosure from one end to the other in an in-line manner. It will be appreciated that the terminal housing 22a can also be configured in butt-style configuration by bonding the blank port unit 24h over one of the feeder port locations 82.

Figure 4:
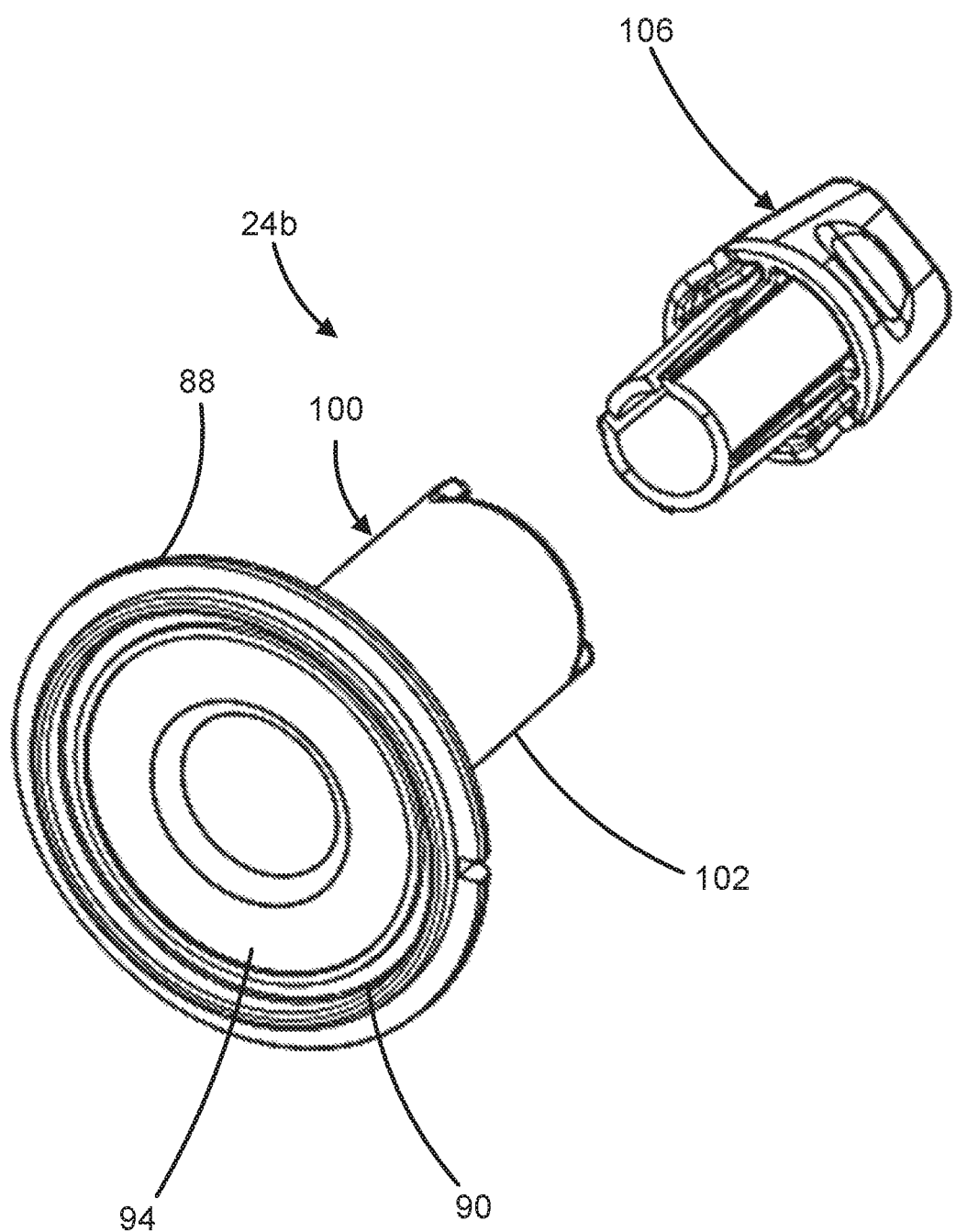
FIG. 4 is another view of the port unit of FIG. 3.

Referring to FIG. 3, the port unit 24b is shown coaxially aligned with the feeder port location 82 at the first end 78 of the terminal housing 22. As shown at FIGS. 3 and 4, the port unit 24b includes the attachment plate 88 which includes an outer side 92 and an inner side 94. It will be appreciated that the inner side 94 is the side that is adapted to face inwardly toward the terminal housing 22 and the outer side 92 is adapted to face outwardly away from the terminal housing 22. The second bonding interface 90 is provided at the inner side 94 of the attachment plate 88. The attachment plate 88 as well as the second bonding interface 90 are both depicted as being circular in shape. In the depicted example, a rotational keying feature is provided between the feeder port location 82 and the attachment plate 88. In the depicted example, the attachment plate 88 includes a keying notch 96 that receives a corresponding key 98 at the feeder port location 82. This way, it is insured that the port unit 24b is mounted at the appropriate rotational orientation relative to the terminal housing 22.

Referring again to FIGS. 3 and 4, the port unit 24b includes a cable securement location 100 depicted as a cable anchoring sleeve 102 that projects outwardly from the outer side 92 of the attachment plate. In the depicted example, the cable anchoring sleeve 102 extends along an axis that is perpendicular relative to the outer side 92 of the attachment plate 88. Thus, the cable anchoring sleeve 102 is perpendicularly oriented relative to the attachment plate 88. The port unit 24b defines a fiber passage 104 that extends through the cable anchoring sleeve 102 and through the attachment plate 88. In the depicted example of FIGS. 3 and 4, the cable securement location 100 further includes an anchoring plug 106 that fits within an outer end of the cable anchoring sleeve 102. The anchoring plug 106 defines a central passage 108 in communication with the fiber passage 104 and also includes openings 110 (e.g., blind openings) at opposite sides of the central passage 108. The openings 110 are configured for receiving strength elements (e.g., reinforcing elements made of fiber glass reinforced epoxy, metal or other materials) of the cable securement location 100.

Figure 5:
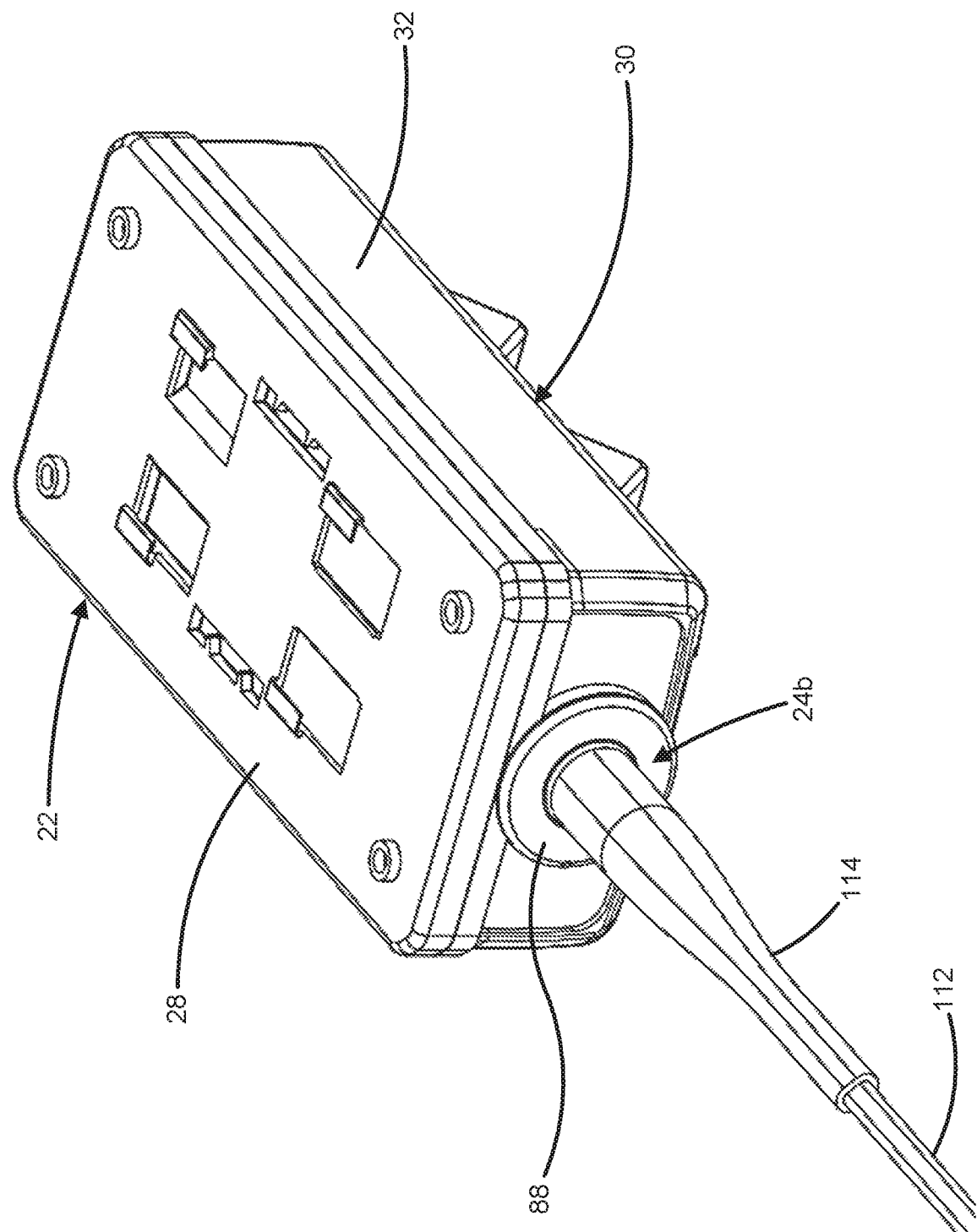
FIG. 5 is a perspective view of the terminal of FIG. 3 with the port unit bonded to the terminal and with a fiber optic cable fixed to the port unit.
Figure 6:
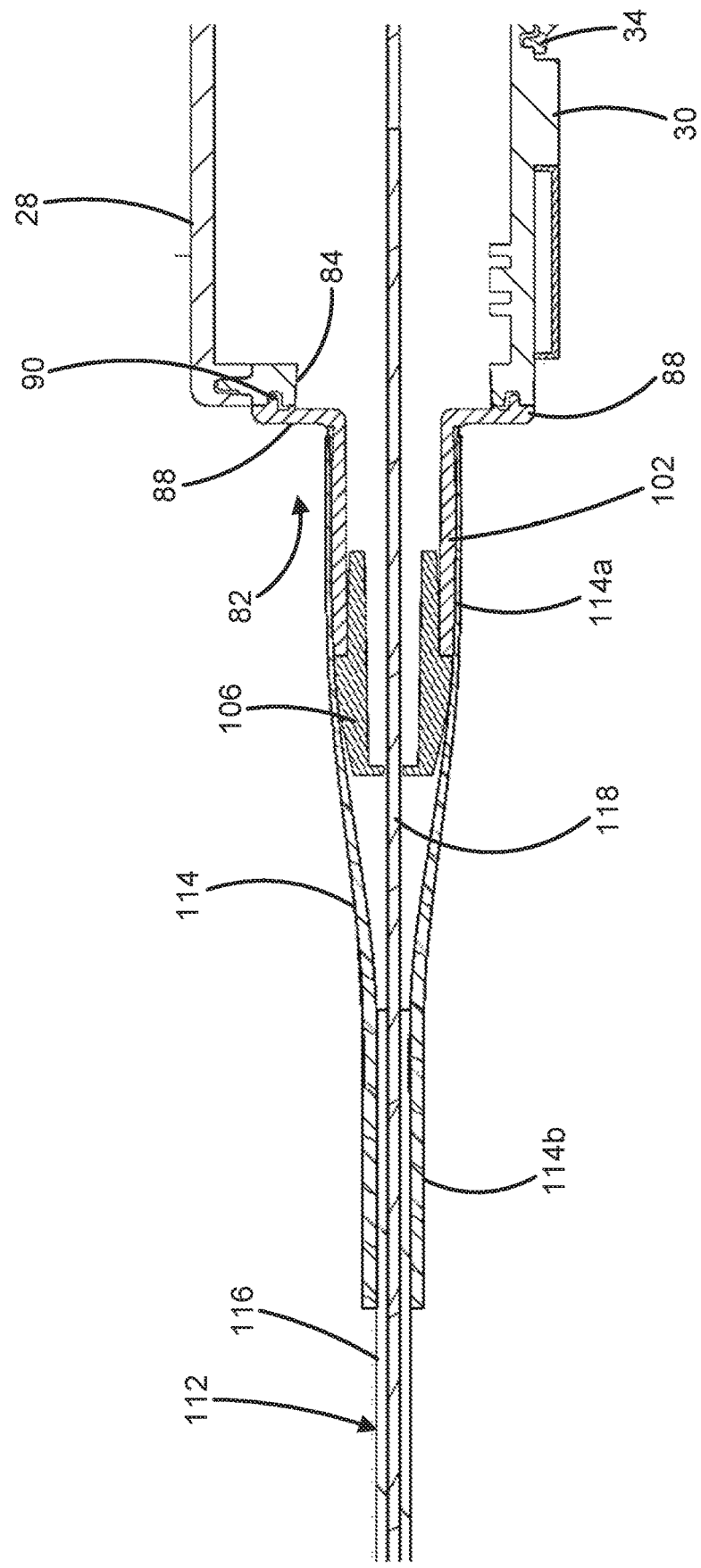
FIG. 6 is a cross-sectional view cut axially through a portion of the port unit and terminal of FIG. 5.

The port unit 24b is adapted for providing a cable port at the feeder port location 82. For example, FIG. 5 shows the port unit 24b anchoring a fiber optic cable 112 at the port location 82 such that one or more optical fibers of the fiber optic cable 112 can be fed into the interior of the terminal housing 22. FIG. 6 shows the fiber optic cable 112 anchored to the cable anchoring sleeve 102 by a cable affixing sleeve 114 such as a shape-memory sleeve or an over molded sleeve. In a preferred example, the cable affixing sleeve 114 is a heat shrink sleeve having heat activated adhesive within the sleeve for facilitating bonding the sleeve 114 with respect to an outer surface of the cable anchoring sleeve 102 as well as with respect to an outer surface of a jacket 116 of the fiber optic cable 112. Specifically, the cable affixing sleeve 114 includes a first portion 114a overlapping and bonded to the cable anchoring sleeve 102 and a second portion 114b overlapping and bonded to a jacket 116 of the fiber optic cable 112. An optical fiber 118 is shown routed from the fiber optic cable 112 through the interior of the port unit 24b and into an interior of the terminal housing 22. FIG. 6 also shows the second bonding interface 90 on the inner side of the attachment plate 88 mated with and bonded to the first bonding interface 86 surrounding the opening 84 at the terminal housing 22. With the port unit 24b mounted at the port location 82, the opening 84 is covered by the attachment plate 88.

FIGS. 7-17 depict a sequence of steps for securing the fiber-optic cable 112 to the feeder port location 82 at the first end 78 of the terminal housing 22. As shown at FIG. 7, an end of the fiber optic cable 12 is initially processed by stripping off an end portion of the jacket 116 to expose the internal optical fiber 118 as well as strength members 120 of the fiber optic cable 112. It will be appreciated that the fiber optic cable 112 is a flat cable having a cross-sectional shape with a major dimension and a minor dimension. The strength members 120 are aligned along the major dimension on opposite sides of the optical fiber 118. As part of the processing operation, after stripping, the strength members 120 can be trimmed such that a desired length projects beyond the cable jacket 116.

Figure 8:
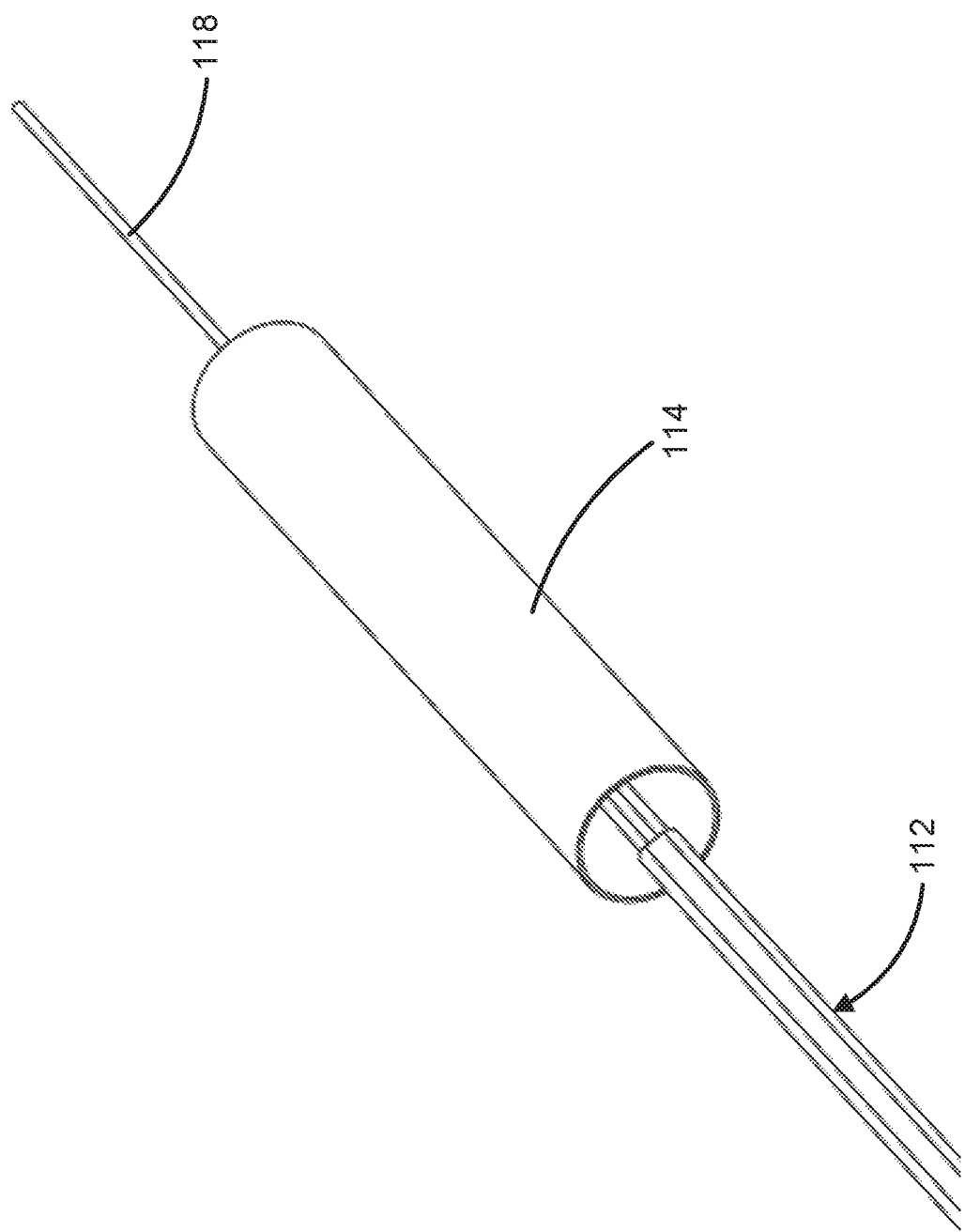
Figure 9:
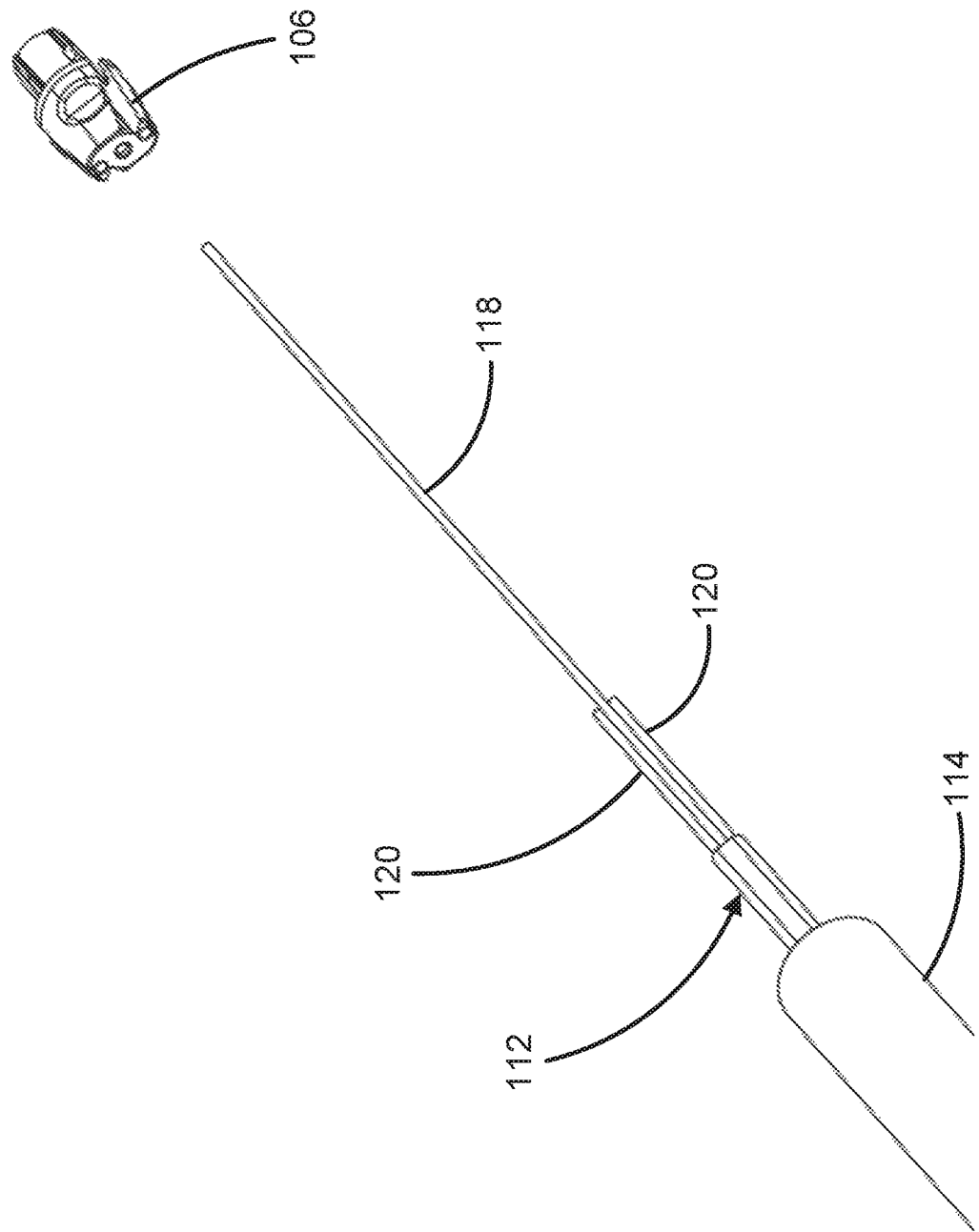
Figure 10:
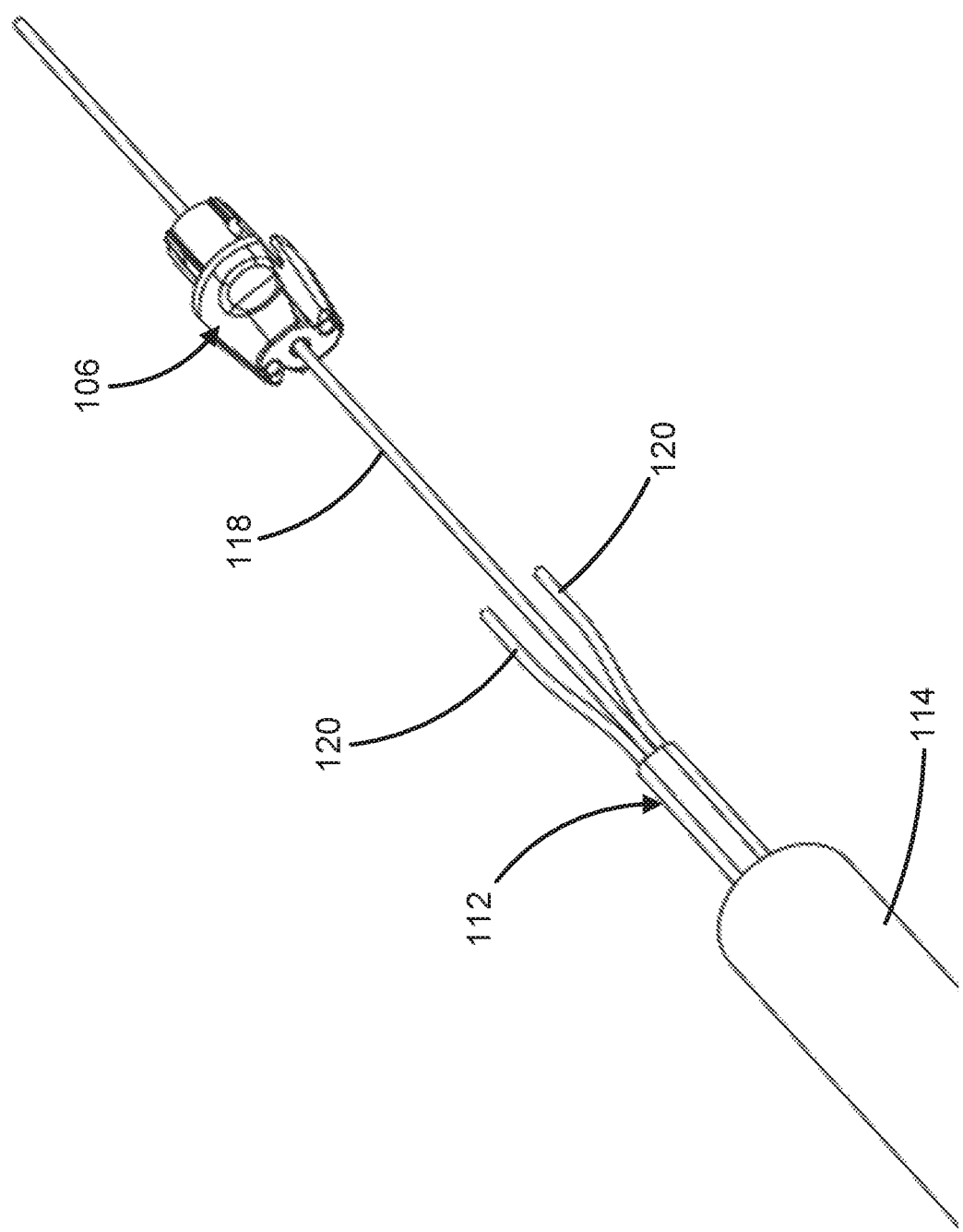
Figure 11:
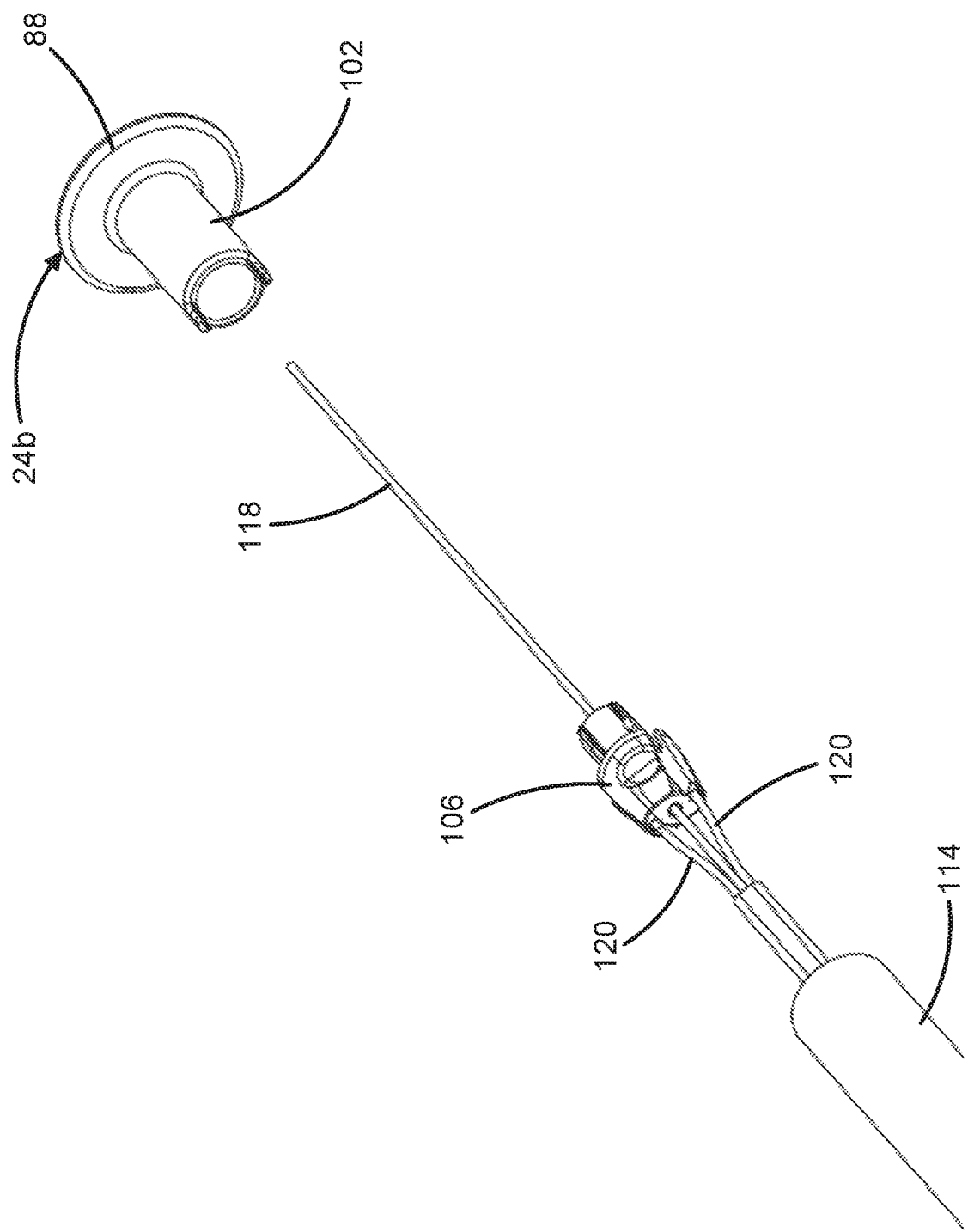
Figure 12:
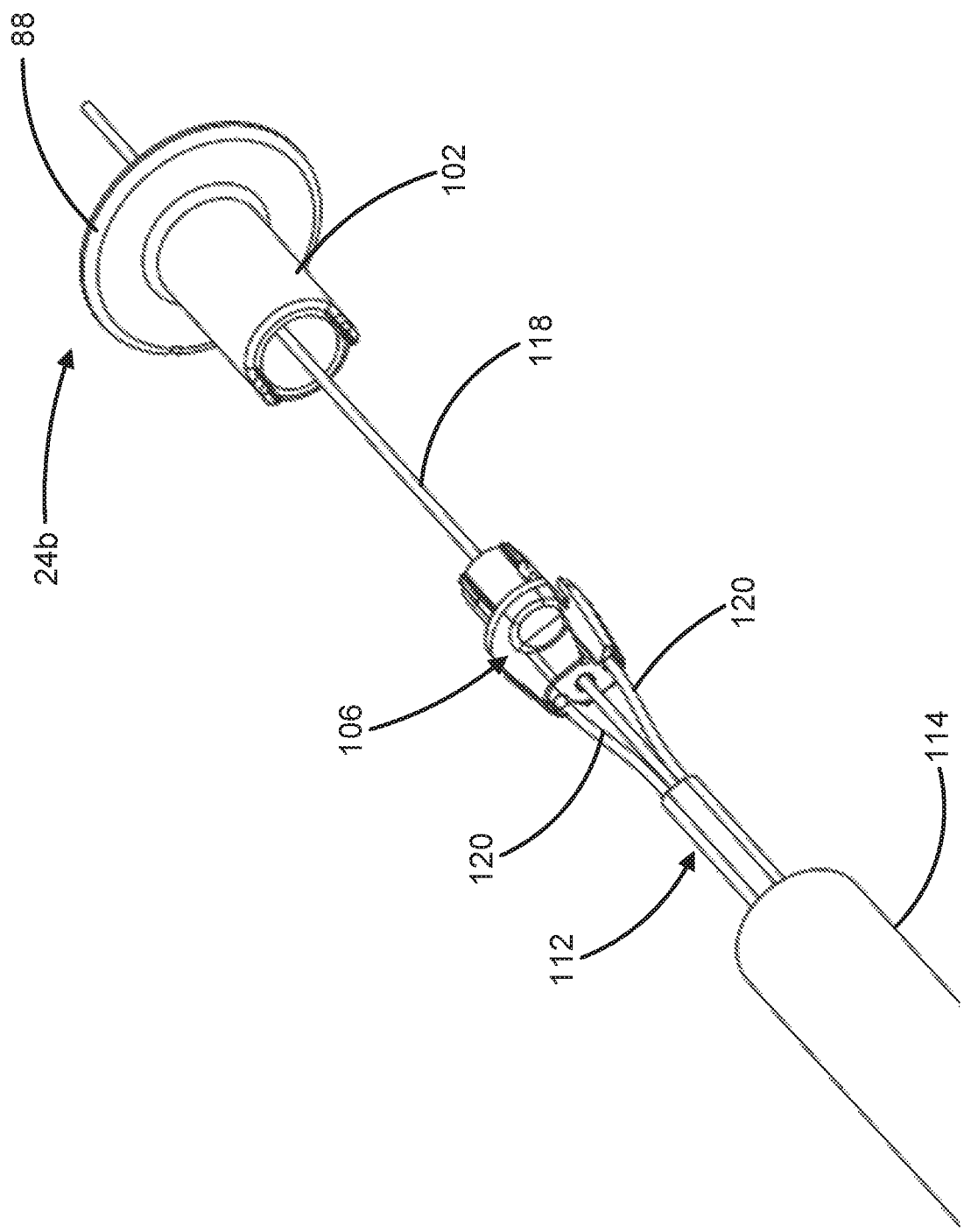
Figure 13:
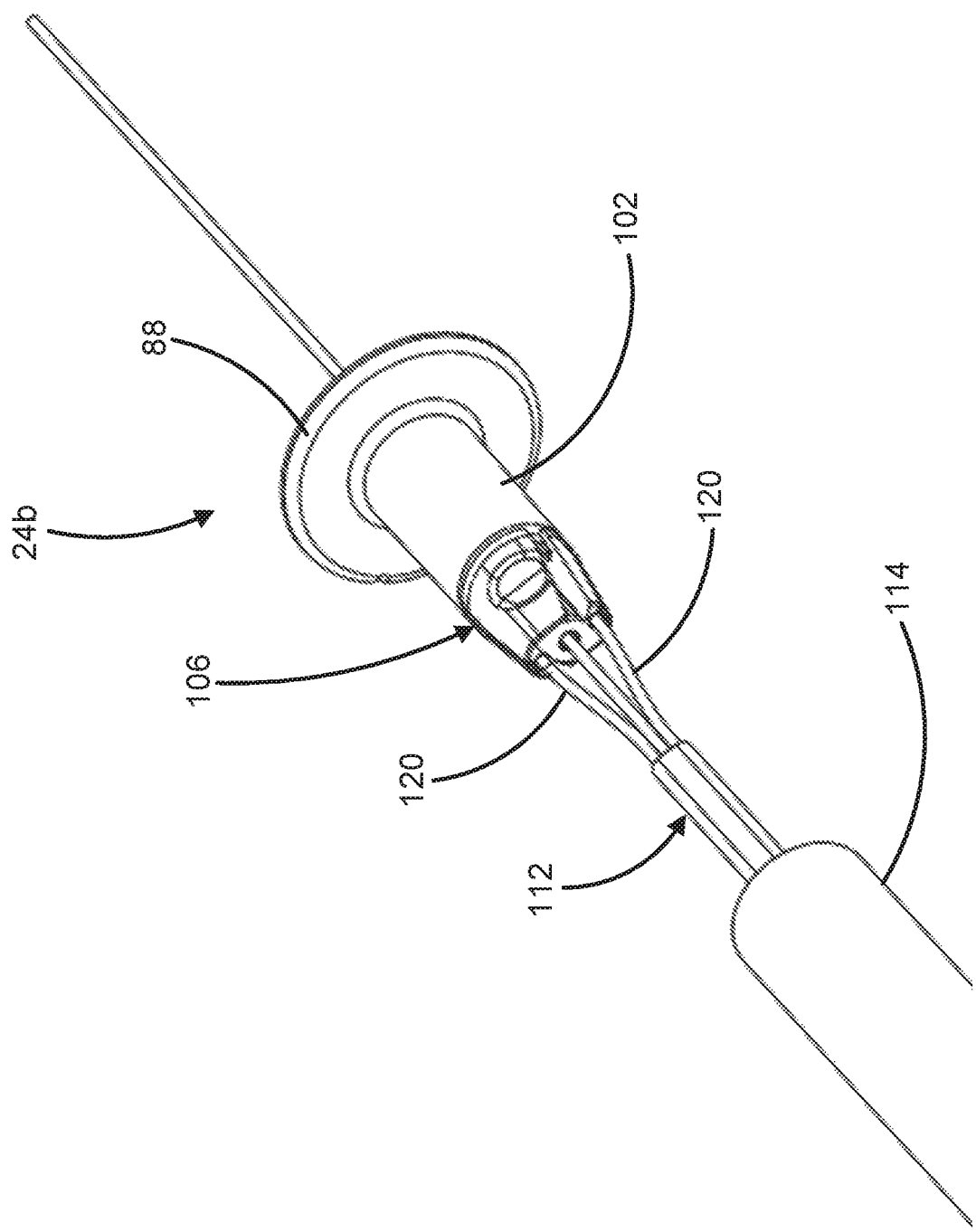

Once the fiber optic cable 112 has been processed, the cable affixing sleeve 114 is slid over the cable 114 as shown at FIG. 8. Next, the optical fiber 114 is fed through the central passage 108 of the anchoring plug 106 and the strength members 120 are inserted into the openings 110 of the anchoring plug 106 as shown by FIGS. 9-11. It will be appreciated that the openings 110 of the anchoring plug 106 function to prevent pistoning of the strength members 120 into the interior of the terminal housing 22 and have blocking surfaces that oppose ends of the strength members. Once the anchoring plug 106 has been mated with the strength members 120, the optical fiber 118 is passed through the fiber passage 104 of the port unit 24b as shown at FIG. 12 and the anchoring plug 106 is inserted into the outer end of the cable anchoring sleeve 102 as shown in FIG. 13. It will be appreciated that keys between the anchoring plug 106 and the cable anchoring sleeve 102 ensure that the anchoring plug 106 is mounted at the proper rotational orientation relative to the cable anchoring sleeve 102. In one example, it is desirable for the major cross-section dimension of the fiber optic cable 112 to be canted at an oblique angle (e.g., about 45 degrees) relative to the front face and rear face of the terminal housing 22 when the fiber optic cable 112 is attached to the terminal housing 22. Such canting can help with fiber routing of the flat drop cable particularly in conditions such as when the terminal 22 is mounted within a hand hole.

Figure 14:
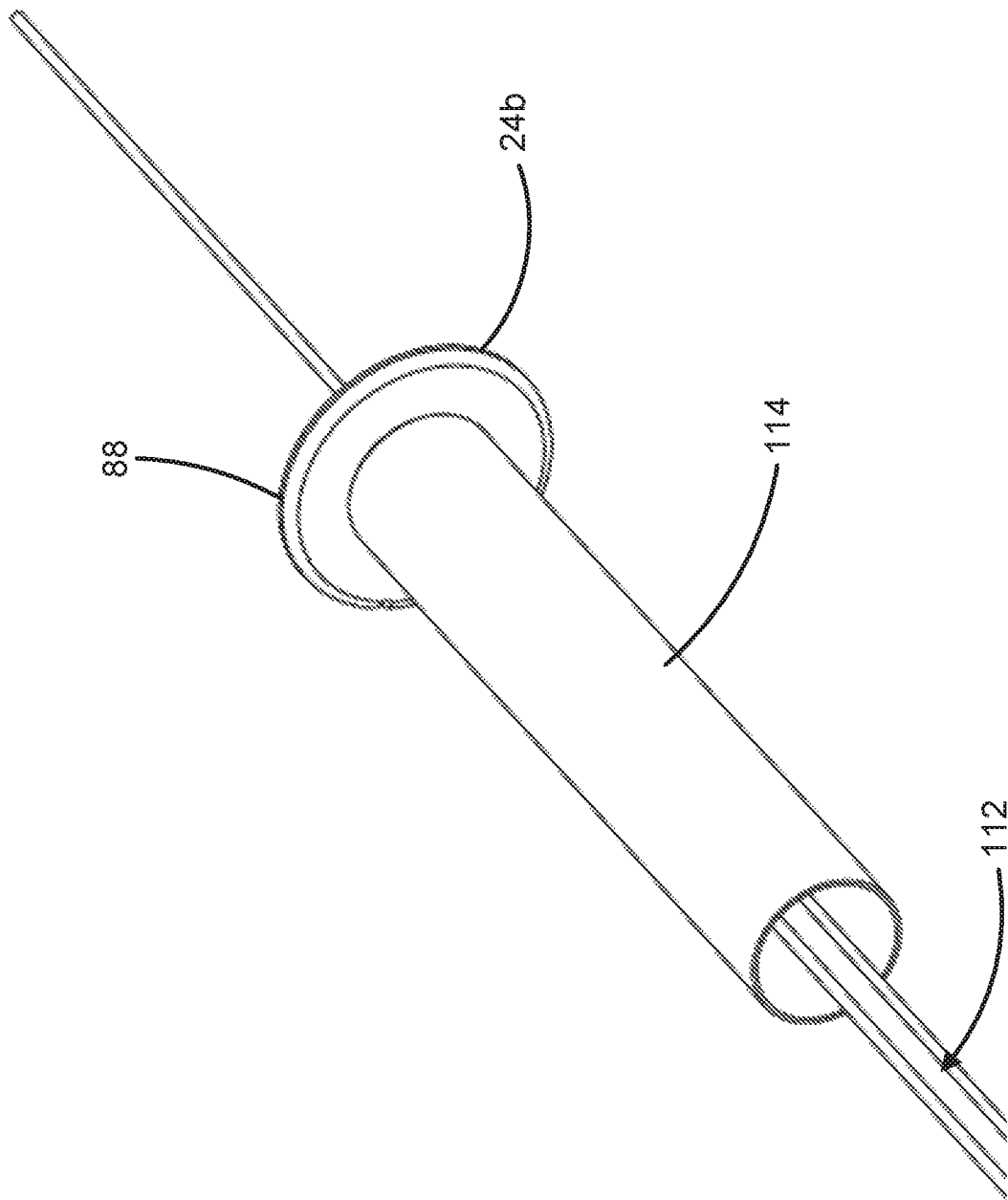
Figure 15:
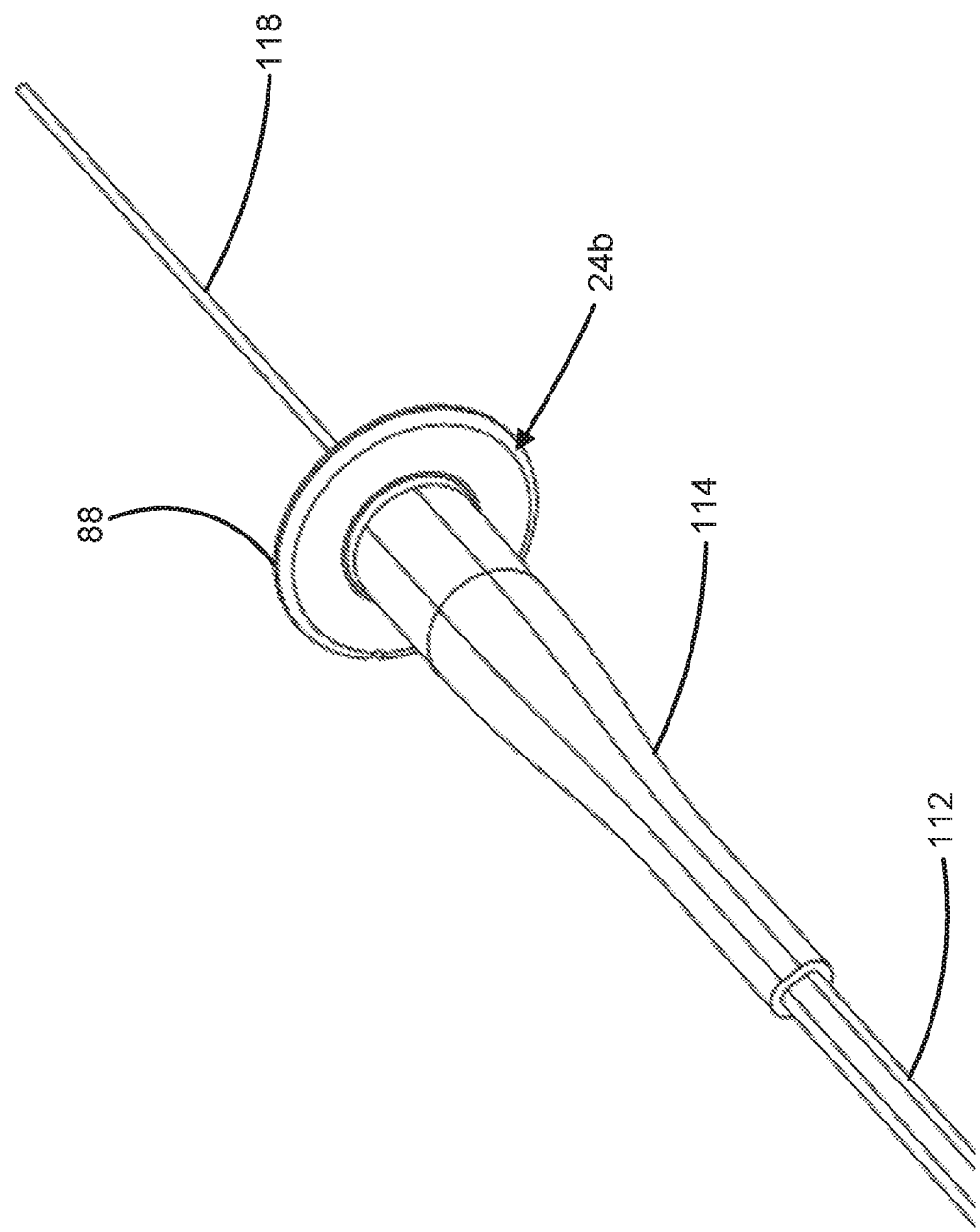
Figure 16:
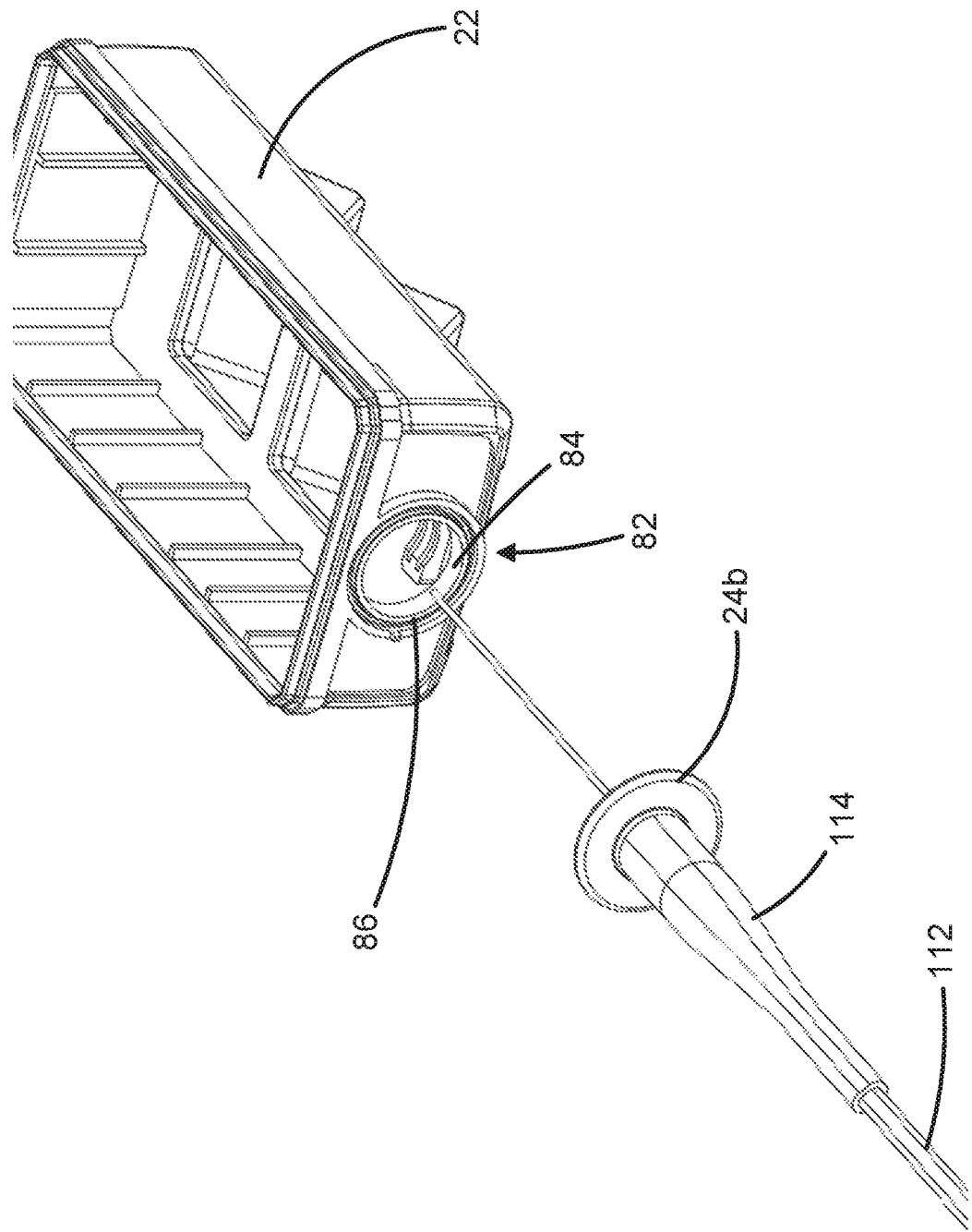
Figure 17:
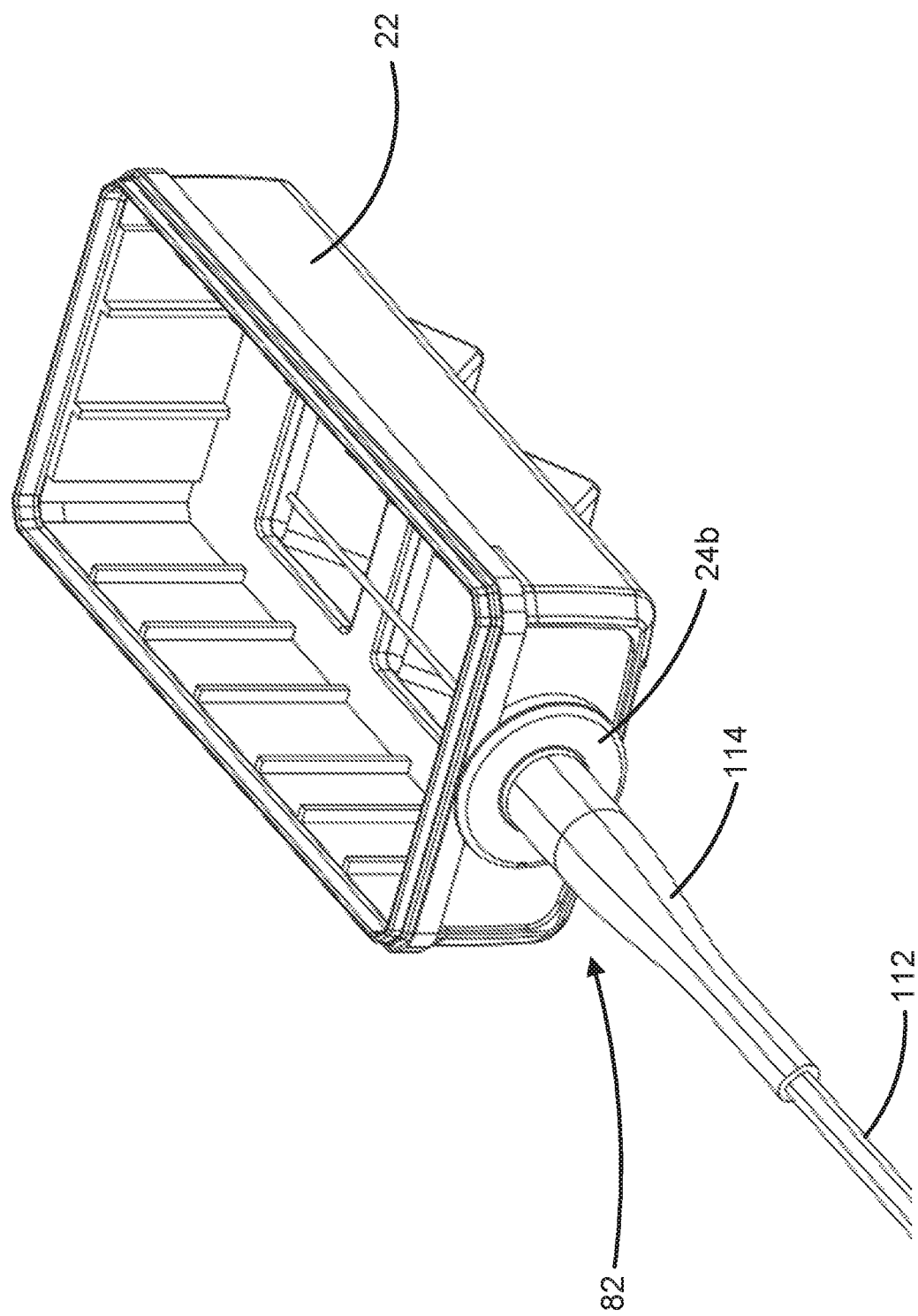

Once the anchoring plug 106 has been inserted within the cable anchoring sleeve 102, the cable affixing sleeve 114 is slid up over the cable anchoring sleeve as shown at FIG. 14, and then is shrunk down on the cable anchoring sleeve 102 and the jacket 116 as shown at FIG. 15 to secure the fiber optic cable 112 to the port unit 24b. After the cable 112 has been secured to the port unit 24b, the optical fiber 118 is routed through the opening 84 at the feeder port location 82 into the interior of the terminal housing 22 as shown at FIG. 16 and then the first and second bonding interfaces 86 and 90 are bonded together such that the attachment plate 88 is bonded to the terminal housing 22 at a location in which the attachment plate 88 aligns with and covers the opening 84. Once the port unit 24b has been coupled to the terminal housing 22, the optical fiber 118 can be routed within the interior of the housing 22 and can be optically coupled to the drop terminal ports or any optical components within the enclosure. Thereafter, the base 28 of the terminal housing 22 can be bonded to the cover 30 of the terminal housing 22. In certain examples, bonding interfaces can be provided between the base 22 and the cover 30 as well as between the drop port modules 34 and the main cover body 32, such that the same bonding technologies can be used to provide all of the bonding needed to assemble all of the various components of the telecommunications enclosure together. FIG. 5 shows the base 28 bonded to the cover 30.

Figure 18:
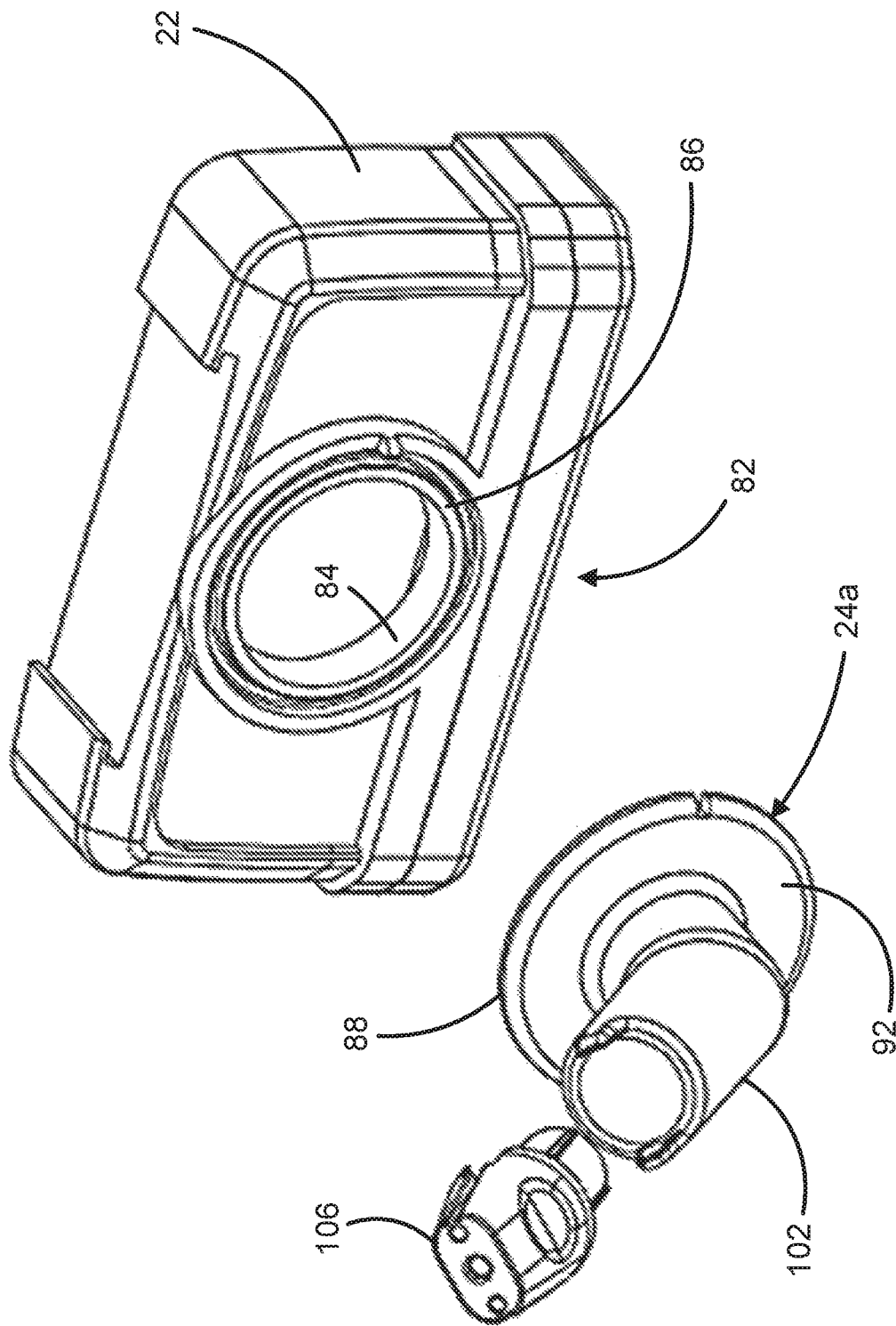
FIG. 18 illustrates another port unit in accordance with the principles of the present disclosure aligned with a corresponding bonding interface of a terminal.
Figure 19:
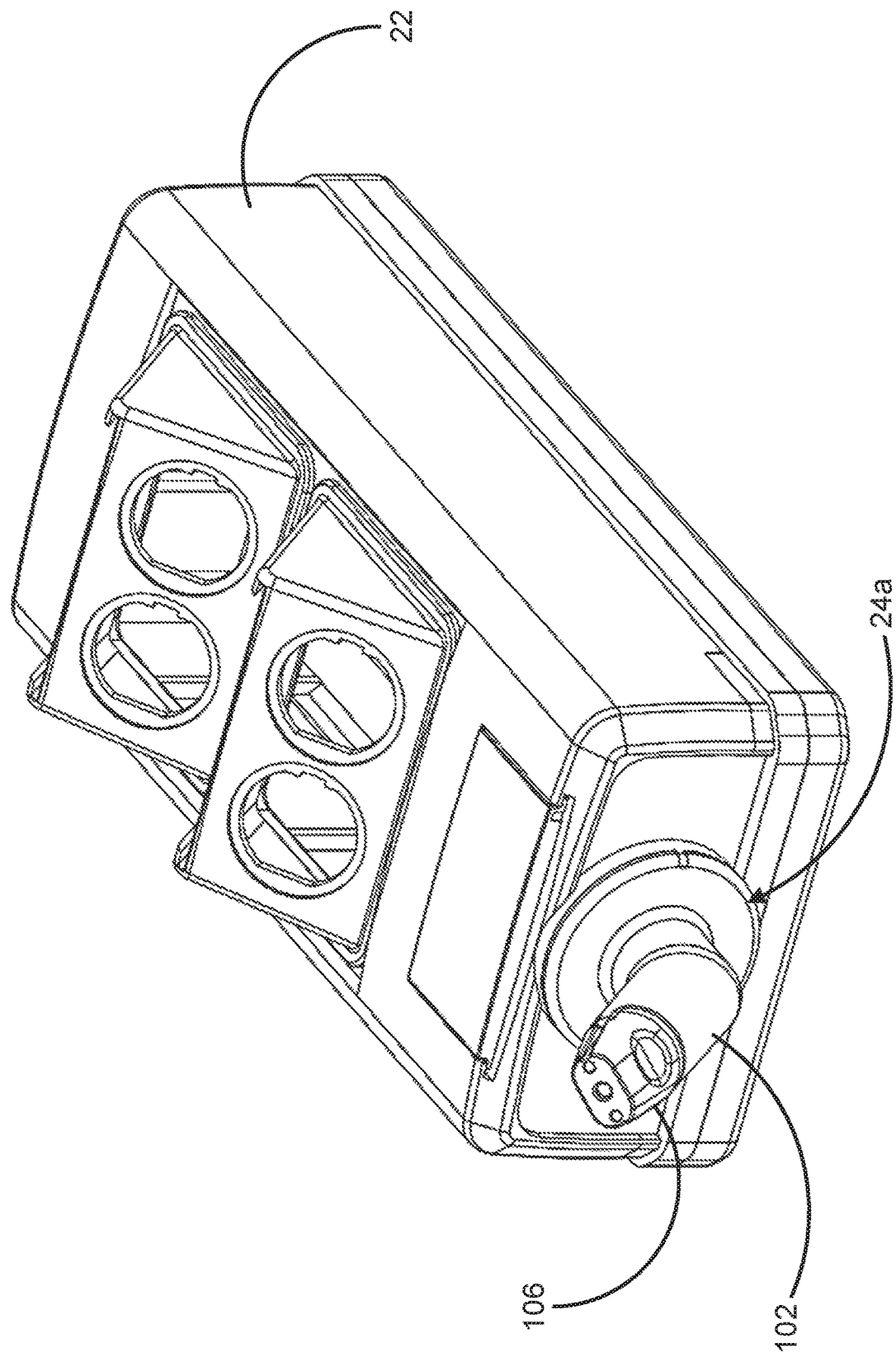
FIG. 19 shows the port unit of FIG. 18 bonded to its corresponding terminal.
Figure 20:
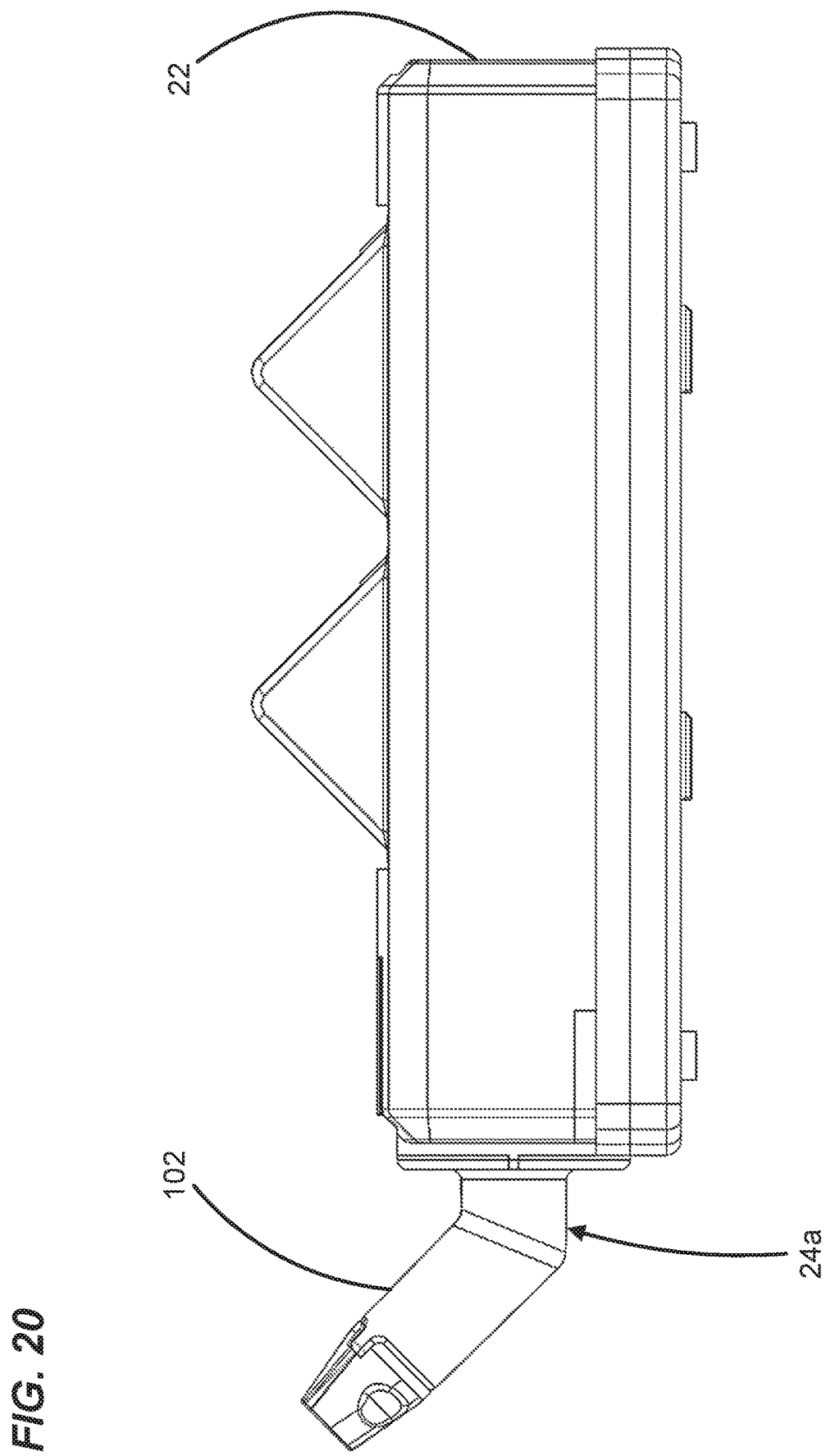
FIG. 20 is a side view of the terminal and port unit of FIG. 19.

FIG. 18 shows the port unit 24a aligned with feeder port location 82 of the terminal housing 22. The port unit 24a is adapted for securing a fiber optic cable to the terminal housing 22. The port unit 24a has the same basic configuration as the port unit 24b except that the port unit 24a has a cable anchoring sleeve 102 that is oriented at an oblique angle relative to the outer side 92 of the attachment plate 88. Because of the oblique angling of the cable anchoring sleeve 102, the optical fiber 118 of the fiber optic cable 112 will turn through a bend angle as the optical fiber passes through the port unit 24a. The oblique angling of the anchoring sleeve 102 causes the cable anchoring sleeve 102 to extend at least partially in the same direction that the drop terminal ports face. For example, the cable anchoring sleeve 102 extends at least partially in the forward direction as shown at FIG. 20. The oblique angling of the cable anchoring sleeve 102 can assist in cable routing within small areas such as within hand holes.

Figure 21:
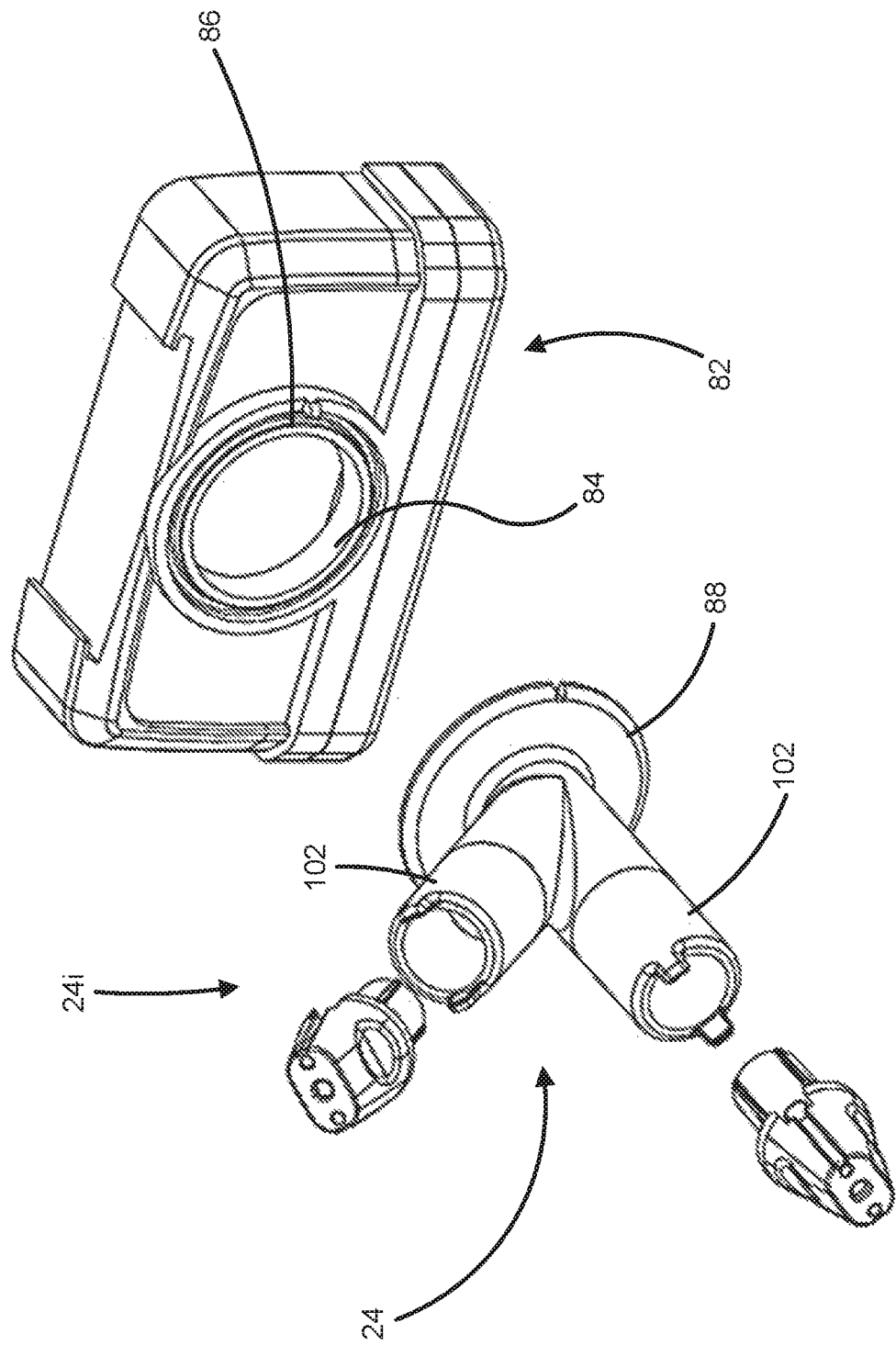
FIG. 21 depicts another port unit in accordance with the principles of the present disclosure shown aligned with a bonding interface of a corresponding terminal housing.

FIG. 21 shows another port unit 24i in accordance with the principles of the present disclosure that can be mounted at the feeder port location 82. The port unit 24i includes the attachment plate 88 having the second bonding interface 90 which is compatible with the first bonding interface 86 located at the first port location 82. The port unit 24i has a similar configuration to the port units 24a and 24b except that the port unit 24i is adapted for anchoring two separate cable to the feeder port location 82 and therefore includes two cable anchoring sleeves 102.

Referring back to FIG. 1, the port unit 24c is adapted for anchoring a flat drop cable to the feeder port location 82. The port unit 24c includes a cable anchoring sleeve 102 having a cross-sectional shape designed to match the shape of a flat drop cable.

Figure 22:
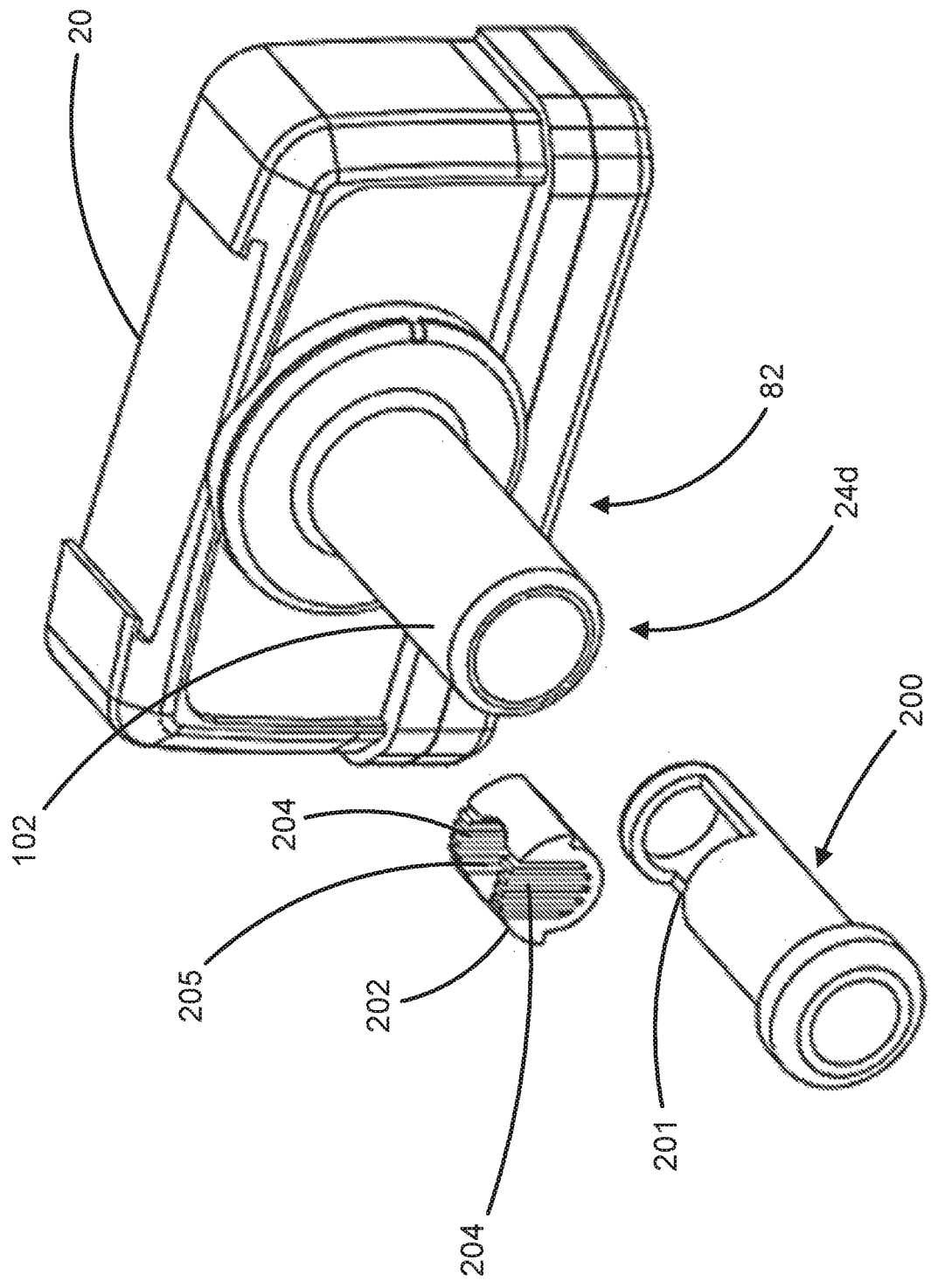
FIG. 22 shows a further port unit in accordance with the principles of the present disclosure bonded to a corresponding terminal housing.

FIG. 22 depicts the port unit 24d bonded to the feeder port location 82 of the terminal housing 22. The port unit 24d is configured for anchoring a round fiber optic cable to the terminal housing 22. The port unit 24d includes a cable anchoring sleeve 102 to which the jacket of a round fiber optic cable can be secured with a cable affixing sleeve in the same manner previously described with respect to flat drop cables. The port unit 24d includes an insert 200 defining a side pocket 201 for receiving a fiber anchoring insert 202. In practice, the fiber of the cable is routed through the insert 200 and through the fiber anchoring insert 202 before installing the insert 200 in the interior of the cable anchoring sleeve 102. An adhesive is applied into the interior of the fiber anchoring insert 202 to lock the fibers axially relative to the insert 200. The fibers can be passed between adhesive barriers 204 depicted as fingers. Adhesives can be applied within the region 205 between the two sets of barrier fingers 204 to provide anchoring of the optical fibers. Once the optical fibers have been anchored, the insert can be inserted into the interior of the cable anchoring sleeve 102 and a cable affixing sleeve can be slid over the assembly to affix the fiber optic cable to the port unit 24d.

Figure 23:
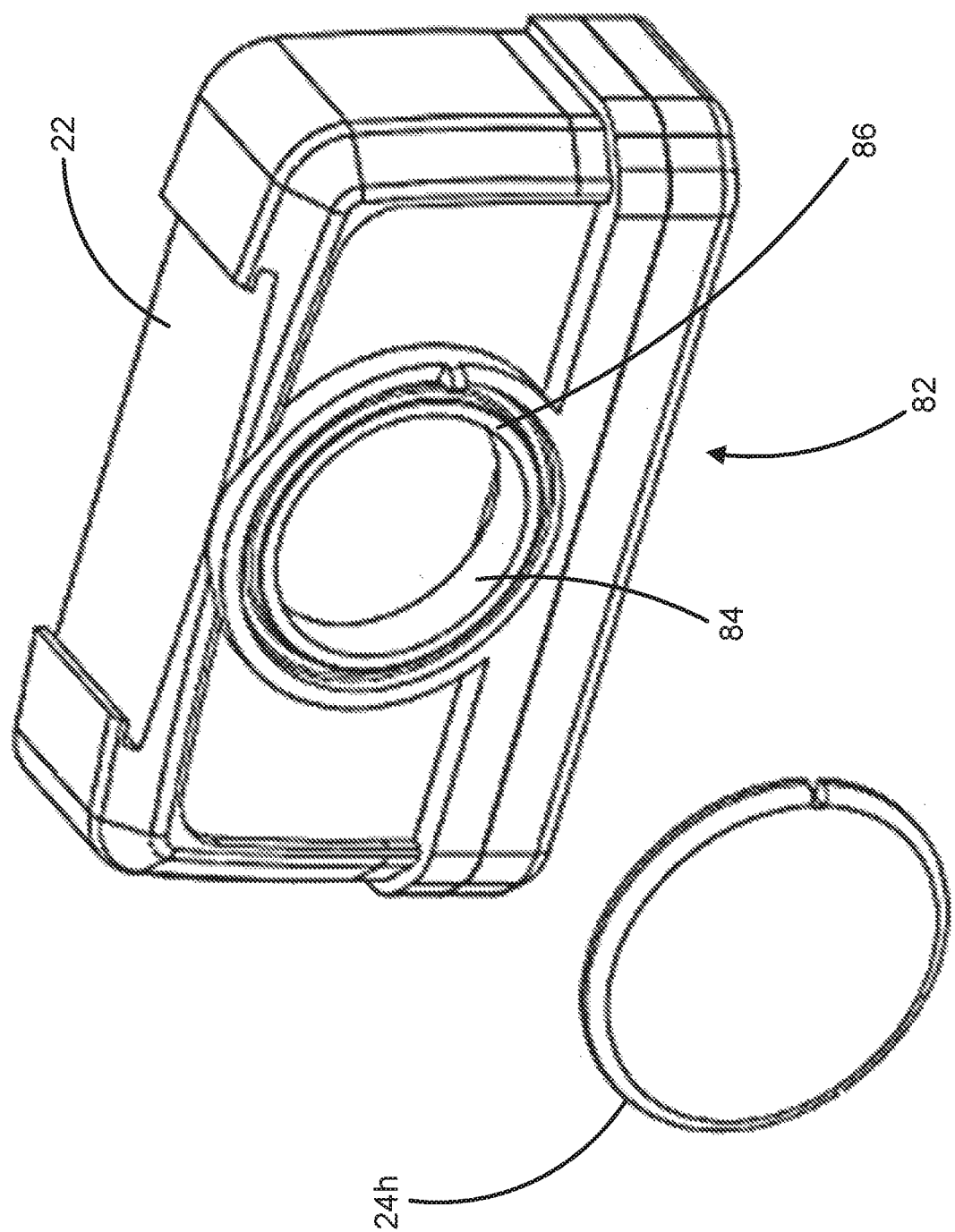
FIG. 23 shows a blank port unit aligned with a bonding interface of a corresponding terminal housing.

FIG. 23 shows the blank port unit 24h aligned with the feeder port location 82.

Figure 24:
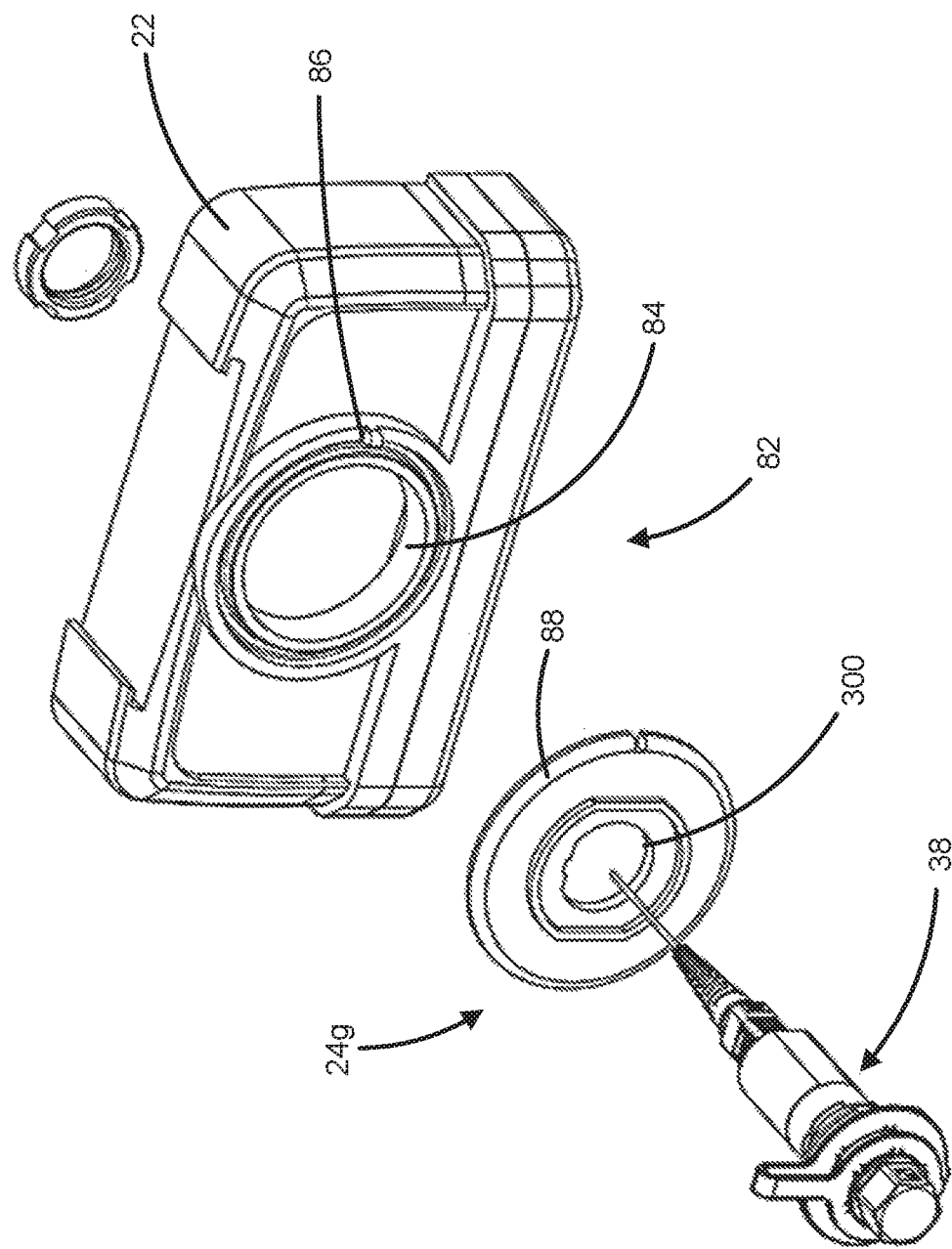
FIG. 24 shows a further port unit in accordance with the principles of the present disclosure aligned with a bonding interface of a corresponding terminal housing.

FIG. 24 shows the port unit 24g aligned with the feeder port location 82 of the terminal housing 22. The port unit 24g includes the attachment plate 88 and also includes one of the hardened fiber adapters 38. The attachment plate 88 defines an opening 300 for receiving the hardened fiber optic adapter 38 such that the non-hardened inner port 44 is positioned inwardly of the inner side 94 of the attachment plate 88 and the hardened outer port 42 faces outwardly from the outer side 92 of the attachment plate 88. The fiber optic adapter 38 can be attached to the attachment plate 88 using the threaded fastener 64 in the same manner shown at FIG. 27. The port unit 24g allows the feeder port location 82 to be configured with a hardened connector port. It will be appreciated that the hardened fiber adapter 38 is depicted as a DLX™ fiber optic adapter which is commercialized by CommScope Incorporated, of Hickory, North Carolina.

Referring to FIG. 1, the port unit 24h includes another style of fiber optic adapter 400 that can be used to provide a hardened connector port at the feeder port location 82. It will be appreciated that the fiber optic adapter 400 can be mounted to the attachment plate 88 with a retaining nut in the same manner as depicted with respect to the hardened fiber optic adapter 38. The fiber optic adapter 400 is an OptiTap style fiber optic adapter commercialized by Corning Cable Systems of Hickory, North Carolina.

Figure 25:
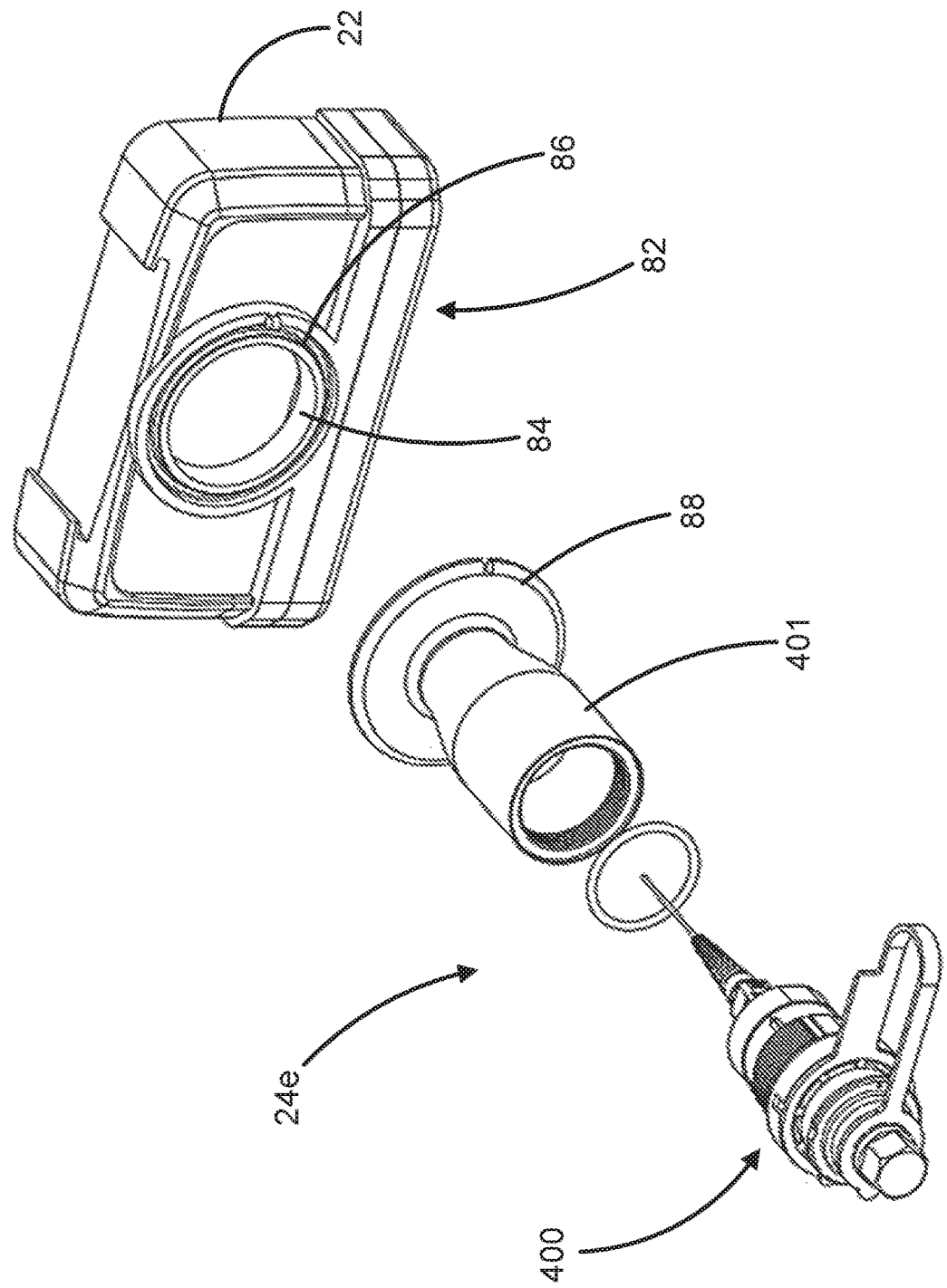
FIG. 25 shows still another port unit in accordance with the principles of the present disclosure aligned with a bonding interface of a corresponding terminal housing.

FIG. 25 shows the port unit 24e aligned with the feeder port location 82 of the terminal housing 22. The port unit 24e includes the same fiber optic adapter 400 as the port unit 24f. Rather than using a coupling nut to secure the adapter to the attachment plate 88, the port unit 24e includes an internally threaded sleeve 401 at the outer side 92 of the attachment plate 88 for allowing the fiber optic adapter 400 to be mounted to the attachment plate 88 by threading the fiber optic adapter 400 into the internally threaded sleeve.

It will be appreciated that the first and second bonding interfaces 86, 90, as well as the bonding interfaces between the housing base and the housing cover and the boding interfaces between the drop port modules and the main body of the housing cover, can be bonded together by any number of different bonding techniques. For example, the interface can be welded together (e.g., friction welded, high-frequency welded, hot gas welded, hot plate welded, solvent welded, laser welded, induction welded, ultrasonically welded, etc.). In certain examples, an intermediate bonding material may be used between the interfaces to bond the interfaces together. Example bonding materials can include adhesive materials such as epoxies. The bonding materials can include thermoset materials and thermoplastic materials. In one example, the bonding interfaces may be bonded together using a strength seal. In certain examples, the strength seal can be disposed within a groove of one of the bonding interfaces adjacent to a tongue of the other of the bonding interfaces. In certain examples, the strength seal can include a thermoplastic bonding material having magnetically active particles to activate the strength seal. To activate the strength seal, an electromagnetic field is introduced to the strength seal. The electromagnetic field induces eddy currents in the magnetically active particles, which heats the particles. Heating the particles softens the thermoplastic material and allows the material to bond with the bonding interfaces desired to be coupled together. The bonding interfaces desired to be coupled together preferably compressed together while the strength seal is activated. Upon cooling, the thermoplastic material hardens, thereby bonding the bonding interfaces together. One example embodiment employs EMABOND™ commercially available from Ashland Specialty Chemical Company of Ohio as the thermoplastic material with embedded magnetically active particles. Additional information relating to strength seals can be found in U.S. Pat. No. 7,753,596, which is hereby incorporated by reference in its entirety.

Referring to FIGS. 28-33, another example port unit 24j is depicted that can incorporated as part of inventory systems such as the inventory system 20. Similar to port units 24a, 24b, 24c, and 24d, the port unit 24j is configured to provide a cable pass-through port. The port unit 24j includes an attachment plate 88 that has an outer side 92 and an inner side 94. A second bonding interface 90 is provided at the inner side 94 of the attachment plate 88 and is compatible with the first bonding interface 86 located at the first port location 82. It will be appreciated that bonding between the port unit 24j and the port location 82 preferably attaches the port unit 24j to the terminal housing 22 and also provides sealing between the port unit 24j and the terminal housing 22. It will be appreciated that the inner side 94 is the side that is adapted to face inwardly toward the terminal housing 22 and the outer side 92 is adapted to face outwardly away from the terminal housing 22. While the attachment plate 88 is shown as being circular, it can also be other shapes such as oval, polygonal, racetrack or other shapes.

In the depicted example, the port unit 24j includes a key 122 (see FIGS. 30 and 31) that can be received in a corresponding keying notch at the feeder port location 82 to provide a rotational keying feature between the feeder port location 82 and the attachment plate 88. This way, it is insured that the port unit 24j is mounted at the appropriate rotational orientation relative to the terminal housing 22.

The port unit 24j includes a cable securement location 124 depicted as a cable anchor sleeve 126 that projects outwardly from the outer side 92 of the attachment plate 88. In the example depicted, the cable anchor sleeve 126 is integral with (e.g., formed in one seamless piece with) or coupled to, the attachment plate 88, although alternatives are possible. The attachment plate 88 defines an opening 128 and the cable anchor sleeve 126 defines a passage 130 that extends therethrough from the opening 128 of the attachment plate 88. The plate 86 and the sleeve 126 form an outer attachment housing 127 with a passage (e.g., defined by opening 128 and passage 130) that extends through the attachment housing in an inward-to-outward orientation.

The port unit 24j further includes an anchoring plug 500 that mounts at an outer end of the cable anchoring sleeve 126. The anchoring plug 500 is adapted to couple with an armored cable thereby rendering the port unit 24j suitable or anchoring an armored cable to the feeder port location 82. The anchoring plug 500 includes an enlarged head 160 (see FIG. 34) and an axial extension 161 (see FIG. 34). The axial extension 161 is depicted as an open-sided channel member 504 having an open side 162 covered by a cover piece 144. When the anchoring plug 500 is mounted at an outer end (e.g., a distal end 134) of the cable anchoring sleeve 126 as shown at FIGS. 28-33, the axial extension 161 fits within the cable anchoring sleeve 126 and a shoulder 164 (see FIG. 33A) of the enlarged head 160 abuts against the outer end 134 of the cable anchoring sleeve 126. The enlarged head 160 has a truncated conical outer shape having a major diameter 165 adjacent the shoulder 164 and a minor diameter 167 adjacent an outer end of the enlarged head 160. The enlarged head 160 defines a pocket 168 at the outer end of the enlarged head. The pocket 168 has a transverse cross-sectional shape that matches the outer transverse cross-sectional shape of an armored cable 170 (see FIG. 33B) such that a jacketed end 171 of the armored cable 170 can be received and secured within the pocket 168. In one example, the cable 170 can be adhesively secured in the pocket 168 prior to installation of the anchoring plug 500 in the cable anchoring sleeve 126. The pocket 168 includes an inner shoulder 169 (see FIGS. 33A and 33B) adapted to oppose the jacketed end 171 of the cable 170 when the cable 170 is inserted in the pocket 168. In the depicted example, the pocket 169 and the outer shape of the cable 170 are round.

The anchoring plug 500 can be secured to the cable anchor sleeve 126 via a snap interface 132 (e.g., snap fit arrangement). That is, the distal end 134 of the cable anchor sleeve 126 may include flexible latches 136 (see FIGS. 28 and 34) positioned on opposite sides thereof. The latches 136 can have a cantilevered configuration having a base end integral with main body of the sleeve 126 and a free end. The flexible latches 136 can each define a receptacle 138 (e.g., aperture) for receiving respective locking members 140

Figure 35:
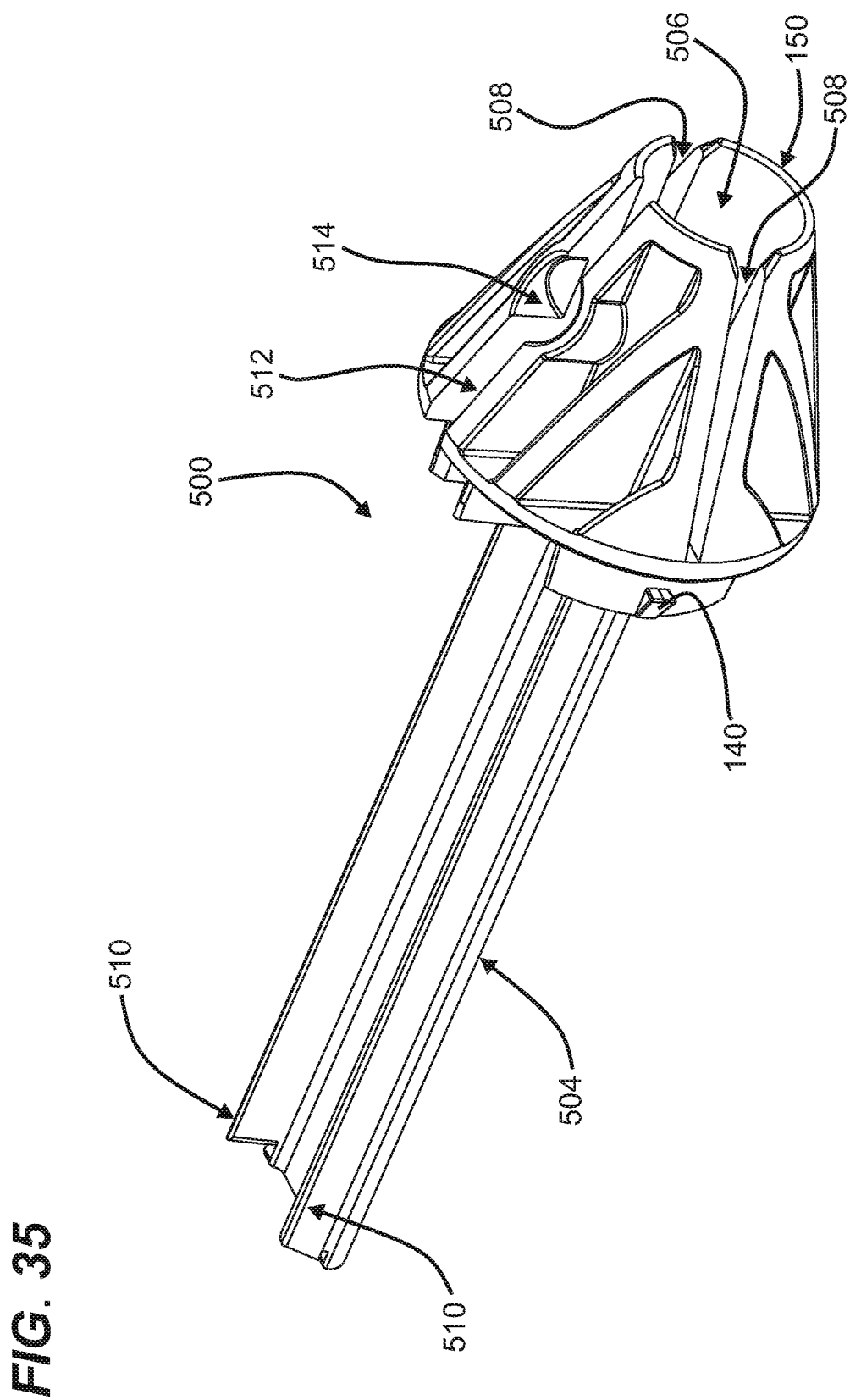
FIGS. 35-36 are perspective views of a cable anchoring plug of the port unit of FIG. 28.
Figure 36:
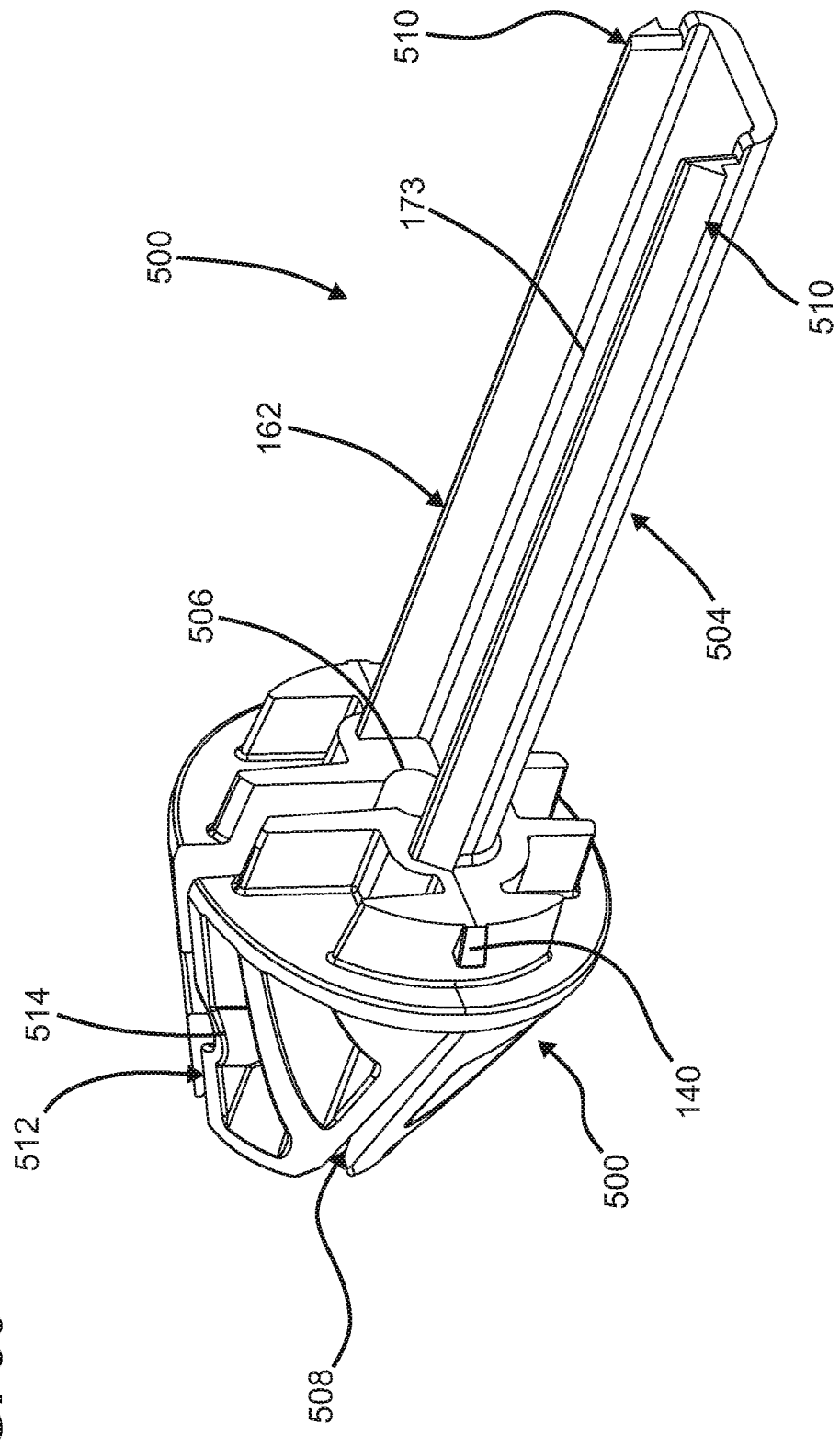

(e.g., locking tabs, see FIGS. 35 and 36) located on opposite sides of the anchoring plug 500. The cable anchor sleeve 126 may also include a key 142 to ensure that the anchoring plug 500 is mounted at the proper rotational orientation relative to the cable anchoring sleeve 126. That is, the key 142 ensures proper rotational alignment between the anchoring plug 500 and the cable anchor sleeve 126 when the anchoring plug 500 is inserted into the cable anchor sleeve 126 through the distal end 134 of the cable anchoring sleeve 126.

A snap fit connection can be achieved when the locking members 140 are captured within respective receptacles 138 of the latches 136 to secure the anchoring plug 500 to the cable anchor sleeve 126. The latches 136 can flex to accommodate the locking members 40 as the anchoring plug 500 is inserted in the sleeve 126, and can snap to retaining positions once the locking members 140 enter the receptacles 138. In other examples, the anchoring plug 500 can be attached to the cable anchor sleeve 126 using alternative or additional attachments structures such as a fastener, adhesive, a crimp, a heat shrink sleeve or other means.

Turning to FIG. 34, an exploded view of the port unit 24j is depicted. The cover member 144 of the anchoring plug 500 defines an injection port 146 for receiving an adhesive, such as epoxy used to lock an optical fiber or fibers 172 (see FIG. 33B) of the cable 170 within the channel member 504. The enlarged head 160 of the anchoring plug 500 defines a central passage 506 in communication with a channel 173 of the channel member 504 such at the optical fibers 172 can be routed though the anchoring plug 500 in an outward-to-inward orientation. The central passage 506 also communicates with the pocket 168. The enlarged head 160 also defines a pair of radial slots 508 at opposite sides of the central passage 506 that are in communication with the central passage 506. The slots 508 are configured for receiving strength elements 174 (e.g., reinforcing elements made of material such as fiberglass, aramid yarn or other material being string-like in structure) of the cable 170 when the jacketed end of the cable 170 is installed in the pocket 168. The strength elements 174 can be directed from the cable jacket radially outwardly through the slots 508 to the exterior of the anchoring plug 500 (see FIG. 33B).

In certain examples, a cable affixing sleeve 175 (see FIG. 33B) can be used in the same manner as previously described to secure a jacket 177 of an armored cable 170 to the cable anchoring sleeve 126. In a preferred example, the cable affixing sleeve 175 is a shape-memory sleeve such as a heat shrink sleeve having adhesive within the sleeve for facilitating bonding the sleeve 175 with respect to an outer surface of the cable anchoring sleeve 126 as well as with respect to an outer surface of a cable jacket 177. Additionally, the cable affixing sleeve 175 can be used to secure the strength elements 174 to the cable anchoring sleeve 126. The radial slots 508 allow strength elements 174 of the cable 170 to be routed from the cable 170 radially outwardly through the anchoring plug 500 (see FIG. 33B). Once at the exterior of the plug 500, the strength elements 174 are routed along a curve onto the exterior surface of the cable anchoring sleeve 126 and then extend parallel to the axis of the cable anchoring sleeve 126. The strength elements 174 are captured between the cable anchoring sleeve 126 and the affixing sleeve 175 and are anchored to the cable anchoring sleeve 126 by the affixing sleeve 175.

In certain examples, the cover 144 can include opposite side rails 148 that are configured to engage with rail guides 510 disposed on opposing sides of the channel member 504 when the cover 144 is mounted to the channel member 504. In the example depicted, the cover 144 can slide over channel member 504 to enclose the open side of the channel member 504. In other examples, the cover 144 may be mounted over the channel member 504 by a snap fit interface, although alternatives are possible.

Figure 33A:
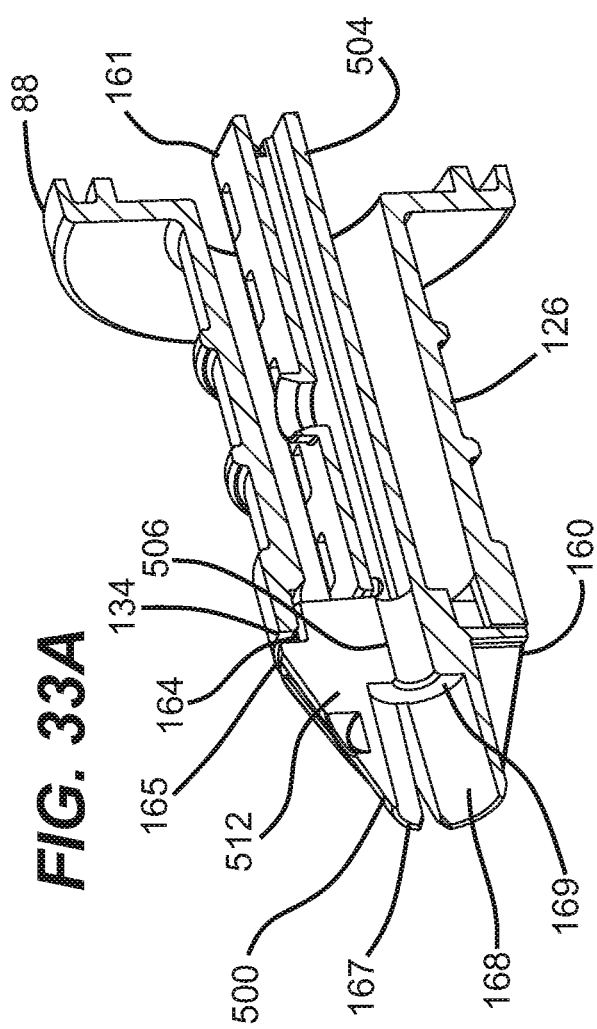
FIG. 33A is a cross-sectional view taken along section line 33A-33A of FIG. 32.
Figure 33B:
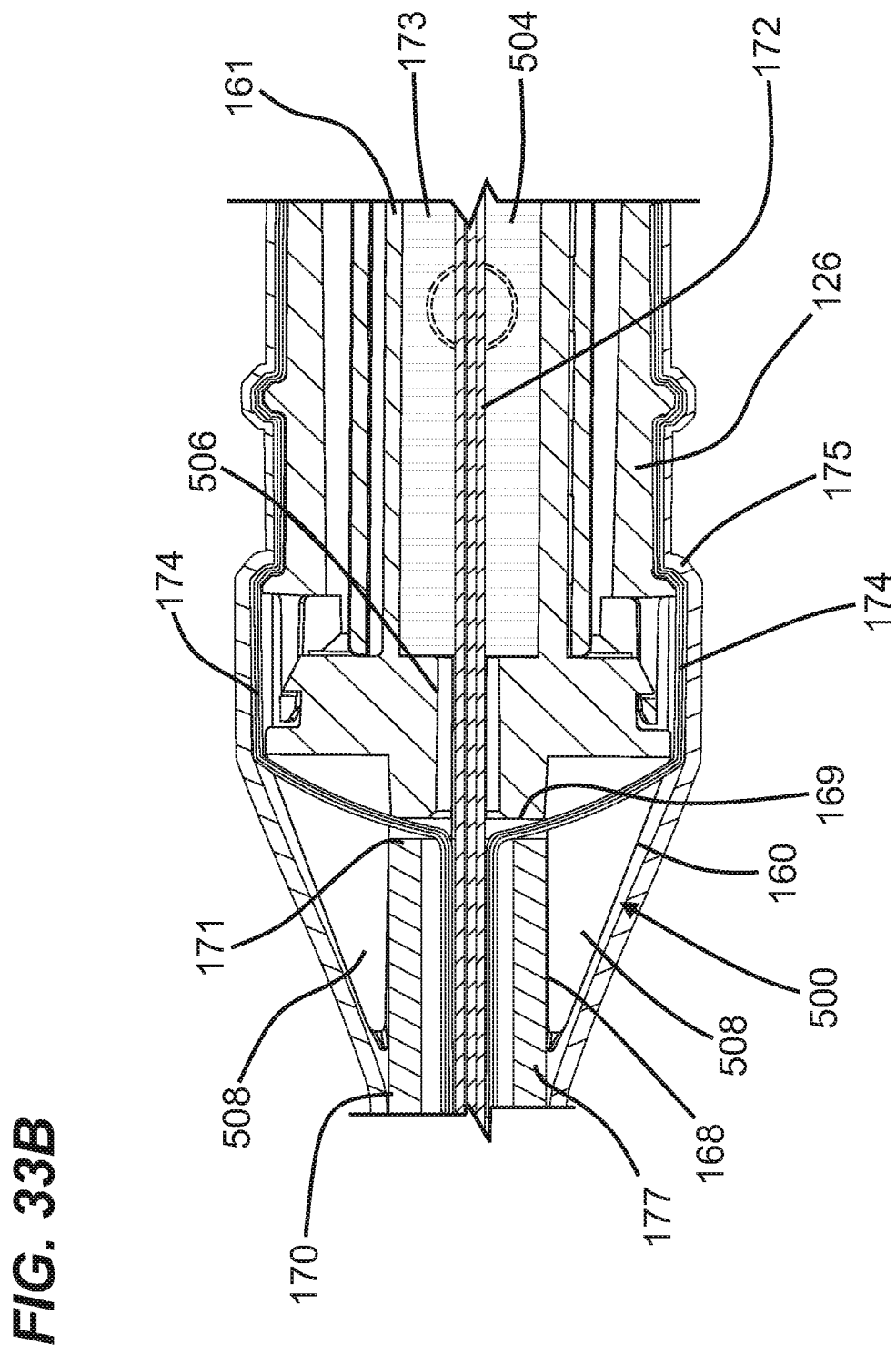
FIG. 33B is a cross-sectional view taken along section line 33B-33B of FIG. 32.
Figure 37:
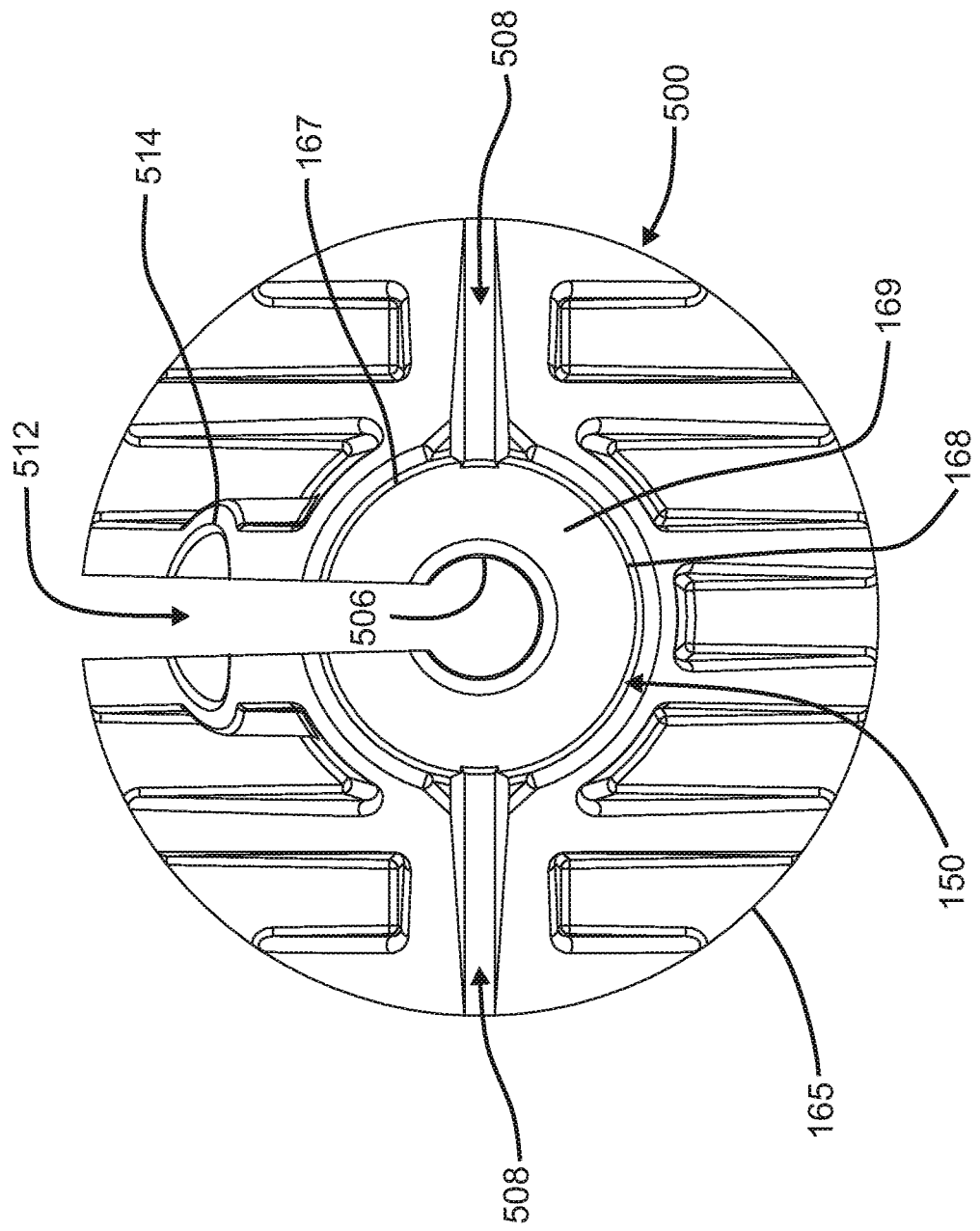
FIG. 37 is an end view of the cable anchoring plug of FIGS. 35 and 36.

Prior to attaching the cable 170 to the anchoring plug 500, a portion of the jacket 171 of the cable 170 is stripped away such that the optical fibers 172 and the strength elements 174 extend beyond the jacket end 171 of the cable jacket 177 (see FIG. 33B). As best shown at FIG. 37, the enlarged head of the anchoring plug 500 defines a fiber insertion slot 512 for laying the extended portions of the optical fibers 172 of the cable laterally/radially into the central passage 506 armored cable adapter 500 and through the channel member 504 when the jacketed end 171 of the cable 170 is inserted into the anchoring plug 500. After routing of the fibers 172 through the anchoring plug 500, the cover 144 can be mounted on the channel 504 to capture the fibers in the channel 504. An adhesive injection location 514 (e.g., an injection port) can be integrated the fiber insertion slot 512. The injection location 514 can be arranged and configured for assisting in coupling the cable jacket to the anchoring plug 500 via adhesive. That is, adhesive may be injected into the injection point 514 of the anchoring plug 500 into the pocket 168 and the central passage 506 to help secure the cable 170 to the anchoring plug 500 to prevent decoupling during the assembly process.

Preferably, the cable is secured to the port unit 24j before the port unit 24j is secured to the terminal housing 22. To install the port unit 24 j to the cable 170, the cable is first attached to the anchoring plug 500. For example, the end of the fiber optic cable 170 is processed by stripping to expose length of the optical fibers 172 and the strength elements 174 that extend beyond the jacketed end 171 of the cable 170. The jacketed end 171 of the cable 170 is then inserted in the end pocket 168 of the anchoring plug 500. Concurrently, the extended portions of the strength elements 174 are routed radially outwardly from the jacketed end 171 through the slots 508, and the extended portions of the optical fibers 172 are routed laterally through the fiber slot 512 and laid in the central passage 506 and the channel 504. As routed, the fibers 172 extend through the anchoring plug 500 in an outward to inward direction. Next, the cable 170 is affixed to the anchoring plug 500 by injecting adhesive through the injection location 512 to bond the jacketed end 171 of the cable 170 within the pocket 168. The cover piece 144 is then mounted at the open side of the channel member 504 to close the open side of the channel member 504 with the optical fibers 172 extending lengthwise though the closed channel member 504. Adhesive is then applied through the injection port 146 of the cover 144 into the channel member 504 of the anchoring plug 500 to lock the optical fibers 172 extending axially through the channel member 504 axially relative to the anchoring plug 500. That is, adhesive can be applied within the channel member 504 between the rail guides 510 to provide anchoring of the optical fibers routed there through.

Once the optical fibers 172 have been anchored, the anchoring plug 500 can be inserted into the interior of the cable anchoring sleeve 126 and latched in place by the snap-fit connection. Preferably, the extended portions of the optical fibers 172 that extend beyond the inner end of the anchoring plug 500 (i.e., extend beyond the end of the channel 504) are inserted (e.g., threaded) axially through the cable anchoring sleeve 126. Subsequently, the sleeve 175 is slid from the cable over the enlarged head of the anchoring plug 500 and over the sleeve 126 thereby capturing the strength elements 174 between the two sleeves 175, 126.

The sleeve 175 is then shrunk down and adhesively bonded in place to secure and seal the cable relative to the port unit 24*j*. The strength elements 174 of the cable 170 are bonded between the outer side of the sleeve 126 and the affixing sleeve 175. The cable anchoring sleeve 126 includes outer circumferential ribs 179 for enhancing retention of the affixing sleeve 175 on the cable anchoring sleeve 126.

After the cable 170 has been secured to the port unit 24*j* as described above, the port unit 24*j* can be secured to a terminal housing such as the terminal housing 22 in the same way described previously. For example, the optical fiber 172 protruding from the inner end of the port unit 24*j* can be routed through the opening 84 at the feeder port location 82 into the interior of the terminal housing 22 and then the first and second bonding interfaces 86 and 90 can be bonded together such that the attachment plate 88 is bonded to the terminal housing 22 at a location in which the attachment plate 88 aligns with and covers the opening 84. Once the port unit 24*j* has been coupled to the terminal housing 22, the optical fibers within the interior of the terminal housing 22 and can be routed within the housing and optically coupled to the drop terminal ports or any other optical components within the enclosure.

Figure 38:
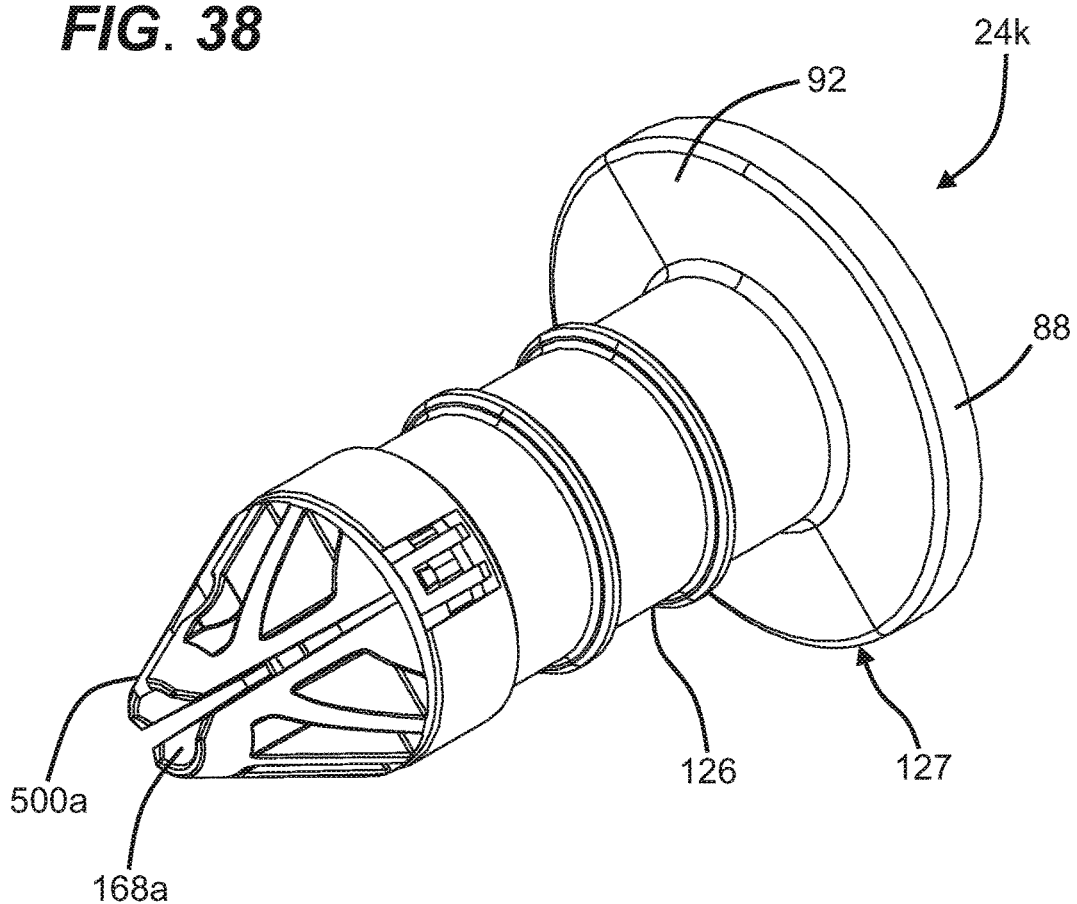
FIG. 38 depicts another port unit in accordance with the principles of the present disclosure.

FIG. 38 shows another port unit 24*k* in accordance with the principles of the present disclosure that can be mounted at the feeder port location 82 and can be part of the inventory system 20. The port unit 24*k* includes the attachment housing 127 having the cable anchoring sleeve 126 and the attachment plate 88. The attachment plate 88 has the second bonding interface which is compatible with the first bonding interface 86 located at the first port location 82. The port unit 24*k* has a similar configuration to the port unit 24*j* except that the port unit 24*k* includes an anchoring plug 500*a* defining a round pocket 168*a* with a diameter smaller than the diameter of pocket 168 of the anchoring plug 500 of the port unit 24*j*. The anchoring plug 500*a* is adapted for securing a cable having a smaller diameter than the cable 170 to the cable anchoring sleeve 126 of the attachment housing 127 formed by the sleeve 126 and the plate 88. Thus, the attachment housing 127 can be used for different cable types, with the different anchoring plugs functioning as cable adapters.

Figure 39:
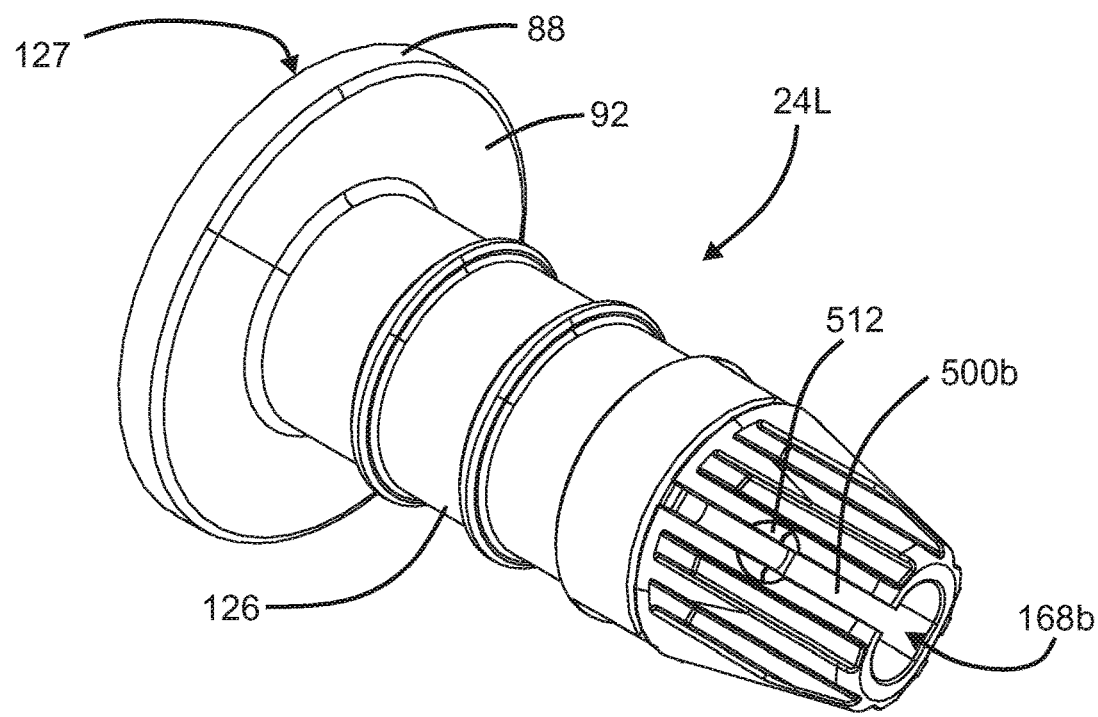
FIG. 39 depicts still another port unit in accordance with the principles of the present disclosure.

FIG. 39 shows another port unit 24*l* in accordance with the principles of the present disclosure that can be mounted at the feeder port location 82. The port unit 24*l* includes the attachment housing 127 having the attachment plate 88 and the cable anchoring sleeve 126. The plate 88 includes the second bonding interface which is compatible with the first bonding interface 86 located at the first port location 82. The port unit 24*l* has a similar configuration to the port unit 24*j* except that the port unit 24*l* includes an anchoring plug 500*b* defining a pocket 168*b* with an elongate transverse cross-sectional profile (e.g., obround, racetrack shaped) suitable for receiving the jacketed end of a flat cable. The anchoring plug 500*b* is thus adapted for securing a flat cable to the cable anchoring sleeve 126 of the attachment housing formed by the sleeve 126 and the plate 88. Thus, the attachment housing can be used for different cable types, with the different anchoring plugs functioning as cable adapters.

The anchoring plug 500*b* does not include the radial slots 508, but instead can include internal blind openings for receiving fiber-reinforced polymer strength rods of the flat cable. Alternatively, the elongate cross-sectional profile of the pocket can extend as a passage through the plug 500*b* for receiving the fibers of the optical fibers, the jacketed end of the cable and the strength rod. In certain examples, the jacketed end of the cable and the strength rods can be adhesively bonded within the passage of the plug 500*b* by injecting adhesive through the injection location 512.

From the forgoing detailed description, it will be evident that modifications and variations can be made without departing from the spirit and scope of the disclosure.

What is claimed is:

1. A method for manufacturing a telecommunications enclosure, the telecommunications enclosure including a terminal housing, the terminal housing including an opening surrounded by a first bonding interface, the method comprising:
    selecting a port unit from a plurality of port units, the port units of the plurality of port units each having an attachment plate including a second bonding interface that is compatible with the first bonding interface, the port units of the plurality of port units including a first port unit including a hardened fiber optic adapter and a second port unit including a cable securement location; and
    bonding the second bonding interface of the selected port unit to the first bonding interface using electromagnetic energy.

2. The method of claim 1, wherein bonding includes welding.

3. The method of claim 1, wherein bonding includes bonding with a bonding material.

4. The method of claim 3, wherein the bonding material is positioned between the attachment plate and the terminal housing.

5. The method of claim 1, wherein the first and second bonding interfaces form a joint.

6. The method of claim 3, wherein the bonding material includes a thermoplastic bonding material.

7. The method of claim 3, wherein the bonding material includes a strength seal including a thermoplastic resin containing magnetically active particles.

8. The method of claim 1, wherein one of the first and second bonding interfaces includes a groove and the other of the first and second bonding interfaces includes a tongue configured to be received within the groove.

9. The method of claim 1, wherein the selected port unit is the second port unit, and wherein a cable is attached to the cable securement location of the second port unit prior to bonding the second bonding interface of the second port unit to the first bonding interface.

10. The method of claim 9, wherein the cable is attached to the cable securement location by a shape memory sleeve that contains adhesive.

11. The method of claim 1, wherein the cable securement location of the second port unit is compatible with a flat cable, wherein the hardened fiber optic adapter of the first port unit is a first type of hardened fiber optic adapter, and wherein the port units of the plurality of port units include a third port unit including a second type of hardened fiber optic adapter and a fourth port unit including a cable securement location compatible with a round cable.

12. The method of claim 1, wherein the first and second bonding interfaces are circular and the attachment plates are rotationally keyed relative to the terminal housing.

13. The method of claim 1, wherein the cable securement location includes a cable anchoring sleeve.

14. The method of claim 13, further comprising a cable anchoring plug that mounts at an outer end of the cable anchoring sleeve.

15. The method of claim 14, wherein the cable anchoring plug is one of a plurality of different cable anchoring plugs mountable at the outer end of the cable anchoring sleeve, the different cable anchoring plugs each being configured to mount a different type of cable to the cable anchoring sleeve.

16. The method of claim 14, wherein the cable anchoring plug includes an extension that fits within the cable anchoring sleeve and an enlarged anchoring head having a shoulder that abuts against the outer end of the cable anchoring sleeve, the anchoring head defining a central passage for receiving an optical fiber of a fiber optic cable and the anchoring head also defining first and second cable strength member openings.

17. The method of claim 16, wherein the cable strength member openings are blind openings for receiving glass-reinforced polymer rods.

18. The method of claim 16, wherein the cable strength member openings are radial slots for receiving Aramid yarn strength members.

19. The method of claim 16, wherein the enlarged anchoring head has a truncated conical shape with a major diameter at the outer end of the cable anchoring sleeve and a minor diameter outwardly offset from the major diameter.

20. The method of claim 19, wherein the cable anchoring plug includes a radial fiber insertion slot through the anchoring head for inserting the optical fiber of the fiber optic cable laterally into the central passage prior to mounting the cable anchoring plug in the cable anchoring sleeve.

21. The method of claim 20, further comprising an adhesive injection port integrated with the radial fiber insertion slot for injecting adhesive into the central passage to bond the cable to the enlarged anchoring head prior to mounting the enlarged anchoring head in the cable anchoring sleeve.

22. The method of claim 21, wherein the central passage includes a pocket for receiving a jacketed end of the fiber optic cable, the pocket including a shoulder for opposing the jacketed end of the fiber optic cable.

23. The method of claim 16, wherein the extension includes an open sided channel for receiving the optical fiber of the fiber optic cable routed through the central passage, wherein the optical fiber can be adhesively affixed to the cable anchoring plug within the open sided channel.

24. The method of claim 23, further comprising a cover for covering an open side of the opened sided channel, the cover including an adhesive injection port for injecting adhesive into the open sided channel to adhesively lock the optical fiber in place within the channel.

25. The method of claim 24, wherein the cable anchoring sleeve extends outwardly from the attachment plate at a perpendicular angle.

26. The method of claim 24, wherein the cable anchoring sleeve extends the outwardly from the attachment plate at an oblique angle.

27. A method for manufacturing a telecommunications enclosure, the telecommunications enclosure including a terminal housing, the terminal housing including an opening surrounded by a first bonding interface, the method comprising:
selecting a port unit from a plurality of port units, the port units of the plurality of port units each having an attachment plate including a second bonding interface that is compatible with the first bonding interface, the port units of the plurality of port units including a first port unit including a hardened fiber optic adapter and a second port unit including a cable securement location; and
bonding the second bonding interface of the selected port unit to the first bonding interface;
wherein the cable securement location includes a cable anchoring sleeve, a cable anchoring plug mounting at an outer end of the cable anchoring sleeve, wherein the cable anchoring plug including an extension that fits within the cable anchoring sleeve and an enlarged anchoring head having a shoulder that abuts against the outer end of the cable anchoring sleeve, the anchoring head defining a central passage for receiving an optical fiber of a fiber optic cable and the anchoring head also defining first and second cable strength member openings.

28. The method of claim 27, wherein the cable strength member openings are blind openings for receiving glass-reinforced polymer rods.

29. The method of claim 27, wherein the cable strength member openings are radial slots for receiving Aramid yarn strength members.

30. The method of claim 27, wherein the enlarged anchoring head has a truncated conical shape with a major diameter at the outer end of the cable anchoring sleeve and a minor diameter outwardly offset from the major diameter.

31. The method of claim 30, wherein the cable anchoring plug includes a radial fiber insertion slot through the anchoring head for inserting the optical fiber of a the fiber optic cable laterally into the central passage prior to mounting the cable anchoring plug in the cable anchoring sleeve.

32. The method of claim 31, further comprising an adhesive injection port integrated with the radial fiber insertion slot for injecting adhesive into the central passage to bond the cable to the enlarged anchoring head prior to mounting the enlarged anchoring head in the cable anchoring sleeve.

33. The method of claim 32, wherein the central passage includes a pocket for receiving a jacketed end of the fiber optic cable, the pocket including a shoulder for opposing the jacketed end of the fiber optic cable.

34. The method of claim 27, wherein the extension includes an open sided channel for receiving the optical fiber of the fiber optic cable routed through the central passage, wherein the optical fiber can be adhesively affixed to the cable anchoring plug within the open sided channel.

35. The method of claim 34, further comprising a cover for covering an open side of the opened sided channel, the cover including an adhesive injection port for injecting adhesive into the open sided channel to adhesively lock the optical fiber in place within the channel.

36. The method of claim 35, wherein the cable anchoring sleeve extends outwardly from the attachment plate at a perpendicular angle.

37. The method of claim 35, wherein the cable anchoring sleeve extends the outwardly from the attachment plate at an oblique angle.

38. A method for manufacturing a telecommunications enclosure, the telecommunications enclosure including a terminal housing, the terminal housing including an opening surrounded by a first bonding interface, the method comprising:
selecting a port unit from a plurality of port units, the port units of the plurality of port units each having an attachment plate including a second bonding interface that is compatible with the first bonding interface, the port units of the plurality of port units including a first port unit including a hardened fiber optic adapter and a second port unit including a cable securement location; and permanently bonding the second bonding interface of the selected port unit to the first bonding interface.

\* \* \* \* \*